US009037274B2

(12) United States Patent
Janik

(10) Patent No.: US 9,037,274 B2
(45) Date of Patent: May 19, 2015

(54) AUDIO CONVERTER DEVICE AND METHOD FOR USING THE SAME

(75) Inventor: Craig M. Janik, Los Altos Hills, CA (US)

(73) Assignee: Viviana Research LLC, Dover, DE (US)

( * ) Notice: Subject to any disclaimer, the term of this patent is extended or adjusted under 35 U.S.C. 154(b) by 196 days.

(21) Appl. No.: 12/917,801

(22) Filed: Nov. 2, 2010

(65) Prior Publication Data

US 2011/0047197 A1 Feb. 24, 2011

Related U.S. Application Data

(63) Continuation of application No. 11/598,366, filed on Nov. 13, 2006, now abandoned, which is a continuation of application No. 10/976,458, filed on Oct. 29, 2004, now Pat. No. 7,142,935, which is a continuation of application No. 09/945,018, filed on Sep. 1, 2001, now Pat. No. 7,142,934.

(60) Provisional application No. 60/230,530, filed on Sep. 1, 2000.

(51) Int. Cl.
  *G06F 17/00* (2006.01)
  *H04H 20/61* (2008.01)
  *G10H 1/00* (2006.01)
  *G11B 20/00* (2006.01)
  *G11B 20/10* (2006.01)

(52) U.S. Cl.
  CPC .............. *H04H 20/61* (2013.01); *G10H 1/0058* (2013.01); *G10H 2230/015* (2013.01); *G10H 2240/061* (2013.01); *G10H 2240/211* (2013.01); *G10H 2240/305* (2013.01); *G11B 20/00007* (2013.01); *G11B 20/10527* (2013.01)

(58) Field of Classification Search
  USPC .......................................................... 700/94
  See application file for complete search history.

(56) References Cited

U.S. PATENT DOCUMENTS

| | | |
|---|---|---|
| 5,434,860 A | 7/1995 | Riddle |
| 5,640,453 A | 6/1997 | Schuchman et al. |
| 5,721,827 A | 2/1998 | Logan et al. |
| 5,724,567 A | 3/1998 | Rose et al. |
| 5,742,599 A | 4/1998 | Lin et al. |
| 5,758,257 A | 5/1998 | Herz et al. |
| 5,790,935 A | 8/1998 | Payton |
| 5,793,980 A | 8/1998 | Glaser et al. |

(Continued)

FOREIGN PATENT DOCUMENTS

| | | |
|---|---|---|
| EP | 0 863 641 | 9/1998 |
| WO | WO-99/18506 | 4/1999 |

(Continued)

OTHER PUBLICATIONS

Bolosky, William J. et al., "Distributed Schedule Management in the Tiger Video Fileserver." In Proceedings of the Sixteenth ACM Symposium on Operating Systems Principles (Saint Malo, France, Oct. 5-8, 1997). pp. 212-223.

(Continued)

*Primary Examiner* — Andrew C Flanders

(57) ABSTRACT

An audio converter device and a method for using the same. The audio converter device receives the digital audio data from a first device via a local area network. The audio converter device decompresses the digital audio data and converts the digital audio data into analog electrical data. The audio converter device transfers the analog electrical data to an audio playback device.

20 Claims, 15 Drawing Sheets

(56) References Cited

U.S. PATENT DOCUMENTS

| | | | |
|---|---|---|---|
| 5,815,206 A | 9/1998 | Malladi et al. | |
| 5,841,979 A | 11/1998 | Schulhof et al. | |
| 5,884,028 A | 3/1999 | Kindell et al. | |
| 5,892,535 A | 4/1999 | Allen et al. | |
| 5,926,624 A | 7/1999 | Katz et al. | |
| 5,990,884 A | 11/1999 | Douma et al. | |
| 5,991,306 A | 11/1999 | Burns et al. | |
| 6,005,566 A | 12/1999 | Jones et al. | |
| 6,008,777 A | 12/1999 | Yiu | |
| 6,169,879 B1 | 1/2001 | Perlman | |
| 6,170,060 B1 | 1/2001 | Mott et al. | |
| 6,175,822 B1 | 1/2001 | Jones | |
| 6,181,284 B1 | 1/2001 | Madsen et al. | |
| 6,192,340 B1 | 2/2001 | Abecassis | |
| 6,225,546 B1 | 5/2001 | Kraft et al. | |
| 6,240,183 B1 * | 5/2001 | Marchant | 380/28 |
| 6,259,707 B1 | 7/2001 | Dara-Abrams et al. | |
| 6,263,503 B1 | 7/2001 | Margulis | |
| 6,301,513 B1 | 10/2001 | Divon et al. | |
| 6,326,982 B1 | 12/2001 | Wu et al. | |
| 6,401,059 B1 | 6/2002 | Shen et al. | |
| 6,424,369 B1 | 7/2002 | Adair et al. | |
| 6,427,165 B1 | 7/2002 | Anderson | |
| 6,434,622 B1 | 8/2002 | Monteiro et al. | |
| 6,434,747 B1 | 8/2002 | Khoo et al. | |
| 6,438,369 B1 | 8/2002 | Huang et al. | |
| 6,453,355 B1 | 9/2002 | Jones et al. | |
| 6,456,783 B1 | 9/2002 | Ando et al. | |
| 6,496,692 B1 | 12/2002 | Shanahan | |
| 6,502,194 B1 | 12/2002 | Berman et al. | |
| 6,526,581 B1 | 2/2003 | Edson | |
| 6,546,419 B1 * | 4/2003 | Humpleman et al. | 709/223 |
| 6,549,942 B1 | 4/2003 | Janky et al. | |
| 6,662,060 B1 | 12/2003 | Maliszewski et al. | |
| 6,678,215 B1 | 1/2004 | Treyz et al. | |
| 6,678,737 B1 | 1/2004 | Bucher | |
| 6,700,893 B1 | 3/2004 | Radha et al. | |
| 6,708,213 B1 | 3/2004 | Bommaiah et al. | |
| 6,717,952 B2 | 4/2004 | Jones et al. | |
| 6,718,551 B1 | 4/2004 | Swix et al. | |
| 6,728,271 B1 | 4/2004 | Kawamura et al. | |
| 6,744,763 B1 | 6/2004 | Jones et al. | |
| 6,745,368 B1 * | 6/2004 | Boucher et al. | 715/205 |
| 6,823,225 B1 | 11/2004 | Sass | |
| 6,826,283 B1 | 11/2004 | Wheeler et al. | |
| 6,826,612 B1 * | 11/2004 | Bosloy et al. | 709/227 |
| 6,829,648 B1 | 12/2004 | Jones et al. | |
| 6,845,398 B1 | 1/2005 | Galensky et al. | |
| 7,117,516 B2 | 10/2006 | Khoo et al. | |
| 7,130,616 B2 | 10/2006 | Janik | |
| 7,191,242 B1 | 3/2007 | Serenyi et al. | |
| 7,366,788 B2 | 4/2008 | Jones et al. | |
| 7,461,393 B1 | 12/2008 | Kishitaka et al. | |
| 7,702,403 B1 | 4/2010 | Gladwin et al. | |
| 2001/0042094 A1 * | 11/2001 | Mitchell et al. | 709/203 |
| 2002/0056112 A1 | 5/2002 | Dureau et al. | |
| 2010/0310230 A1 * | 12/2010 | Ellis et al. | 386/230 |

FOREIGN PATENT DOCUMENTS

| | | |
|---|---|---|
| WO | WO-00/23899 | 4/2000 |
| WO | WO-99/02921 | 4/2000 |
| WO | WO-00/49731 | 8/2000 |
| WO | WO-01/10124 | 2/2001 |
| WO | WO-01/13311 | 2/2001 |
| WO | WO-01/31806 | 5/2001 |
| WO | WO-01/47192 | 6/2001 |
| WO | WO-90/09112 | 1/2004 |

OTHER PUBLICATIONS

Bolosky, William J. et al., The Tiger Video Fileserver, Microsoft Research, Advanced Technology Division, Microsoft Corporation, Redmond, WA, Apr. 1996, 9 pages.

Communication from the European Patent Office on European Patent Application 01968989.2, mailed Sep. 10, 2010.

Degoulet G., et al., EPEOS—Automatic Program Recording System, Nov. 1975, 22 pgs.

Examination Report for EP 01 968989.2, dated Jul. 4, 2007.

Haskin, Roger L., "The Shark Continuous-media File Server," IBM Almaden Research Center, San Jose, CA. Proceedings from Compcon Spring '93, San Francisco, CA, Digest of Papers, Feb. 22-26, 1993, 17 pages.

International Preliminary Examination Report for PCT/US2001/42020, completed Oct. 14, 2003.

International Search Report for PCT/US2001/42020, mailed Nov. 25, 2002.

Jones, Michael B., The Microsoft Interactive TV System: An Experience Report, Microsoft Research, Microsoft Corporation, Redmond, WA, Jul. 1997, 9 pages.

Laursen, Andrew et al., Oracle Media Server: Providing Consumer Based Interactive Access to Multimedia Data, Oracle Media Server Development, 1994, pp. 470-477.

Lee, Jack Y.B., Parallel Video Servers: A Tutorial, IEEE MultiMedia, Apr.-Jun. 1998, pp. 20-28.

Lee, Y.B. et al., A Server Array Approach for Video-on-demand Service on Local Area Networks, The Chinese University of Hong Kong, 1996, pp. 27-34.

Menta, Richard Ethernet MP3 Player for Linux, MP3newswire.net, Aug. 15, 2001, pp. 1-3.

Menta, Richard We Test Drive the Rio Receiver, MP3newswire.net., Aug. 17, 2001, pp. 1-4.

Mock, Jeff, "A Linux Server for the Rio Receiver," pp. 1-8. printed May 22, 2007 from mhtml:file://C:\Documents%20and%20Settings\JarosikG\Local%20Settings\Temp\rio-linu . . . .

Nelson, Michael N. et al., "A Highly Scaleable ITV System," 1995, 14 pages.

Office Action on U.S. Appl. No. 11/598,436, mailed Oct. 30, 2009.

Notice of Allowance on U.S. Appl. No. 09/945,018, mailed Sep. 11, 2006.

Notice of Allowance on U.S. Appl. No. 10/976,458, mailed Sep. 6, 2006.

Notice of Allowance on U.S. Appl. No. 10/976,956, mailed Sep. 15, 2006.

Office Action on U.S. Appl. No. 11/598,367, mailed Apr. 29, 2010.

Office Action on U.S. Appl. No. 09/945,018, mailed Jan. 2, 2004.

Office action on U.S. Appl. No. 09/945,018, mailed Mar. 27, 2006.

Office Action on U.S. Appl. No. 09/945,018, mailed Apr. 25, 2003.

Office Action on U.S. Appl. No. 09/945,018, mailed Apr. 8, 2005.

Office action on U.S. Appl. No. 09/945,018, mailed Sep. 9, 2004.

Office action on U.S. Appl. No. 09/945,018, mailed Oct. 24, 2005.

Office Action on U.S. Appl. No. 10/976,458, mailed Mar. 27, 2006.

Office Action on U.S. Appl. No. 10/976,458, mailed Sep. 28, 2005.

Office Action on U.S. Appl. No. 10/976,956 mailed Apr. 21, 2005.

Office Action on U.S. Appl. No. 10/976,956, mailed Dec. 9, 2005.

Office Action on U.S. Appl. No. 10/976,956, mailed Jun. 1, 2006.

Office Action on U.S. Appl. No. 11/598,366, mailed May 3, 2010.

Office Action on U.S. Appl. No. 11/598,436, mailed Apr. 28, 2010.

Oracle Software to Enable World's First Interactive Television Deployment; BT to Use Oracle Media Server to Deliver Interactive Services to 2,500 Homes, Business Wire, Nov. 15, 1994. pp. 1-3.

PR Newswire, New company Xenote Allows Consumers to 'Bookmark the Real World' with Fun, Personal Internet Device, Jan. 25, 2000, 2 pgs.

Prashant J. Shenoy et al., "Symphony: An Integrated Multimedia File System," University of Texas at Austin, Technical Report, UMI Order No. CS-TR-97-09., Jun. 1998, 15 pages.

Sanuki, T. et al., Design of a video-server complex for interactive television, IBM J. Res. Develop. vol. 42, No. 2, Mar. 1998, pp. 199-218.

Sriram S. Rao et al. "Comparative Evaluation of Server-push and client-pull Architectures for Multimedia Servers," proceedings from NOSSDAV 96, Shonan Village International Conference Center, Zushi, Japan, Apr. 23-25, 1996, 4 pages.

(56) References Cited

OTHER PUBLICATIONS

Tiger Shark File System, IBM, 1995, pp. 1-2.
Tivo, Inc., Form S-1, Jul. 22, 1999, 902 pgs.
Office Action on U.S. Appl. No. 11/598,366, mailed Nov. 9, 2009.
Office Action on U.S. Appl. No. 11/598,367, mailed Nov. 4, 2009.
Office Action on Japanese Application 2002-524143, dated Dec. 16, 2010 (with English summary).

* cited by examiner

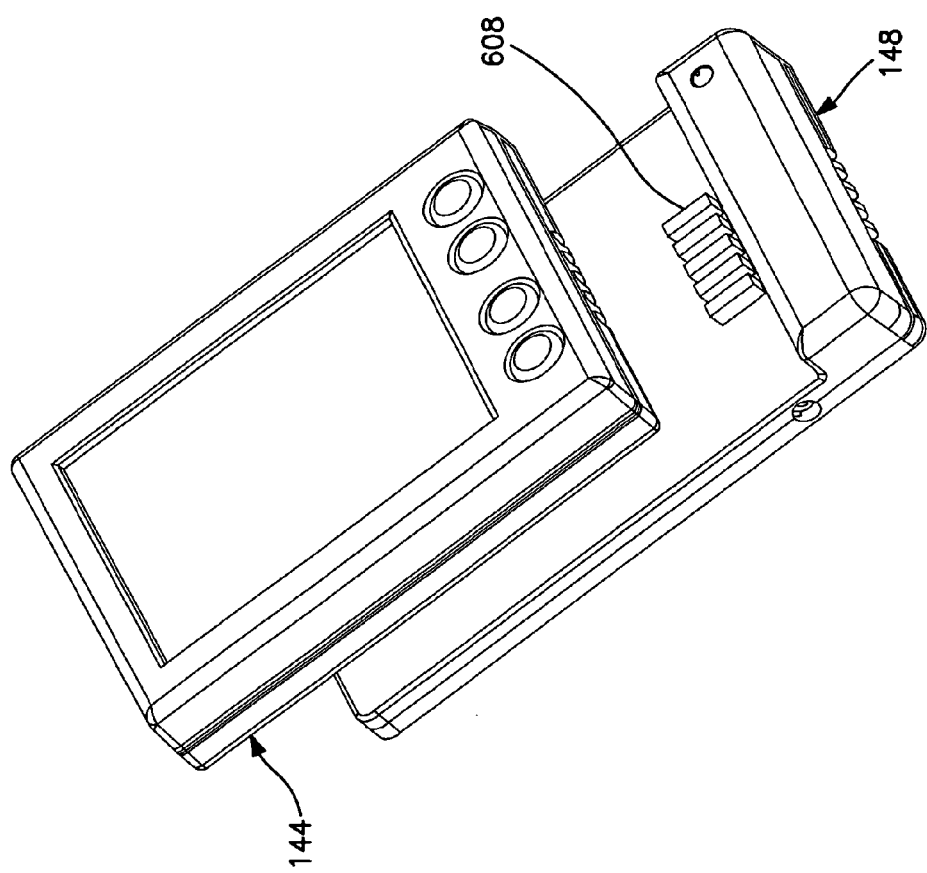

AUDIO CONVERTER DEVICE AND METHOD FOR USING THE SAME

CROSS-REFERENCE TO RELATED PATENT APPLICATIONS

This application is a Continuation of U.S. patent application Ser. No. 11/598,366, filed Nov. 13, 2006, which is a Continuation of U.S. patent application Ser. No. 10/976,458 (now U.S. Pat. No. 7,142,935), filed Oct. 29, 2004, which is a Continuation of U.S. patent application Ser. No. 09/945,018 (now U.S. Pat. No. 7,142,934), filed Sep. 1, 2001, which claims priority from U.S. Provisional Patent Application No. 60/230,530, filed Sep. 1, 2000. Each of these applications is incorporated herein by reference in their entireties.

FIELD OF THE INVENTION

The present invention relates generally to audio playback devices, and more particularly, to an audio converter device to convert digital audio data received from a computer system to analog electrical data to be played on an audio playback device.

BACKGROUND

The rapid buildup of telecommunications infrastructure combined with substantial investment in Internet-based businesses and technology has brought Internet connectivity to a large segment of the population. Recent market statistics show that a majority of households in the U.S. own at least one personal computer (PC), and a significant number of these PCs are connected to the Internet. Many households include two or more PCs, as well as various PC productivity peripherals such as printers, scanners, and the like. Decreases in the cost of PC components such as microprocessors, hard disk drives, memory, and displays, have driven the commoditization of PCs. Although the majority of household PCs are connected to the Internet by dialup modem connections, broadband connectivity is being rapidly adopted, and is decreasing in price as a variety of technologies are introduced and compete in the marketplace. A large majority of households in the U.S. and Europe are viable for at least one or more type of broadband connection, such as cable, DSL, optical networks, fixed wireless, or two-way satellite transmission.

A market for home networking technology has emerged, driven by the need to share an Internet connection between two or more PCs, and to connect all the PCs to productivity peripherals. There has been innovation in local area network (LAN) technology based on end-user desire for simplicity and ease of installation. Installing Ethernet cable is impractical for a majority of end-users, therefore a number of no-new-wires technologies have been introduced. The Home Phoneline Networking Association (HPNA) promotes networking products that turn existing phone wiring in the home into an Ethernet physical layer. Adapters are required that allow each device to plug into any RJ-I1 phone jack in the home. The adapter modifies the signal from devices so that it can be carried by the home phone lines. Existing HPNA products provide data-rates equivalent to 10base-T Ethernet, approximately 10 Mbps. Networking technology that uses the AC power wiring in the home to carry data signals has also appeared. Similar to HPNA devices, adapters are required to convert data signals from devices into voltage fluctuations carried on to and off of the AC wires, allowing any AC outlet to become a network interface. Although both HPNA and power line networking products are convenient to use because they require no new wires, the advantage of AC power line products over HPNA is that AC power outlets are more ubiquitous than RJ-11 phone jacks.

Wireless radio-frequency (RF) LAN technology has also been introduced into the home networking market. Theoretically, wireless technology is the most convenient for the end user to install. There are currently two prevalent standards for wireless networking, Institute of Electrical and Electronics Engineers (IEEE) 802.11b and HomeRF. Both of these systems utilize the unlicensed 2.4 Ghz ISM band as the carrier frequency for the transmission of data. Both of these technologies have effective ranges of approximately 150 feet in a typical household setting. IEEE 802.11b is a direct sequence spread spectrum technology. HomeRF is a frequency-hopping spread spectrum technology. Adapters that are RF transceivers are required for each device to communicate on the network. In addition to utilizing Transmission Control Protocol/Internet Protocol (TCP/IP) protocols, IEEE 802.11 band HomeRF include additional encryption and security protocol layers so that the user's devices have controlled access to data being sent through the LAN.

Due to market competition and the effect of Moore's Law, home networking technology is greatly increasing in performance and availability, while decreasing in price. For example, the current data-rate roadmap shows HomeRF increasing from 10 Mbps to 20 Mbps, utilizing the 5 Ghz band. The IEEE 802.11 technology roadmap shows the introduction of 802.11a at 54 Mbps, also utilizing the 5 Ghz band. It is important to note that LAN data-rates are increasing much faster than wide-area data-rates, such as the data-rates provided by "last mile" technologies including DSL, DOCSIS. Wireless wide area data-rates are also improving slowly. Current digital cellular technology provides less than 64 Kbps data-rates, with most systems providing throughput in the 20 Kbps range.

The MP3 digital audio format is an audio encoding technology that allows consumers to further compress digital audio files such as those found on Compact Disks, to much smaller sizes with very little decrease in sound quality. The MP3 format is the audio layer of MPEG-2 digital audio and video compression and transmission standard. For example, the MP3 format allows for compression of audio content to approximately 1 million bytes per minute of audio, at near Compact Disk quality. This capability, combined with a decrease in the cost of flash memory, a type of non-volatile silicon-based mass memory, has made it possible to develop portable digital audio playback devices. These are devices that are significantly smaller than portable CD players because they contain no moving parts, only flash memory, a microprocessor for decoding MP3 compressed audio content, and batteries. However, the cost per bit of audio content with portable digital audio playback devices is still very high because of the high cost of flash memory. The typical portable digital audio playback device includes enough flash memory to store about one CD's worth of digital music. The result is that the user is burdened with having to continually manually change the music files in the device by plugging the device into the PC and operating a user interface, if they want to listen to a wide range of music.

PC-based MP3 software players have been created that provide a convenient graphical user interface and software decoding of MP3 files. Some technology allows users to play MP3 files on their PC, using an existing sound card with external speakers. However, to listen to MP3s the user must interface with the PC, using a mouse and keyboard, and must be nearby the PC sound output equipment.

The smaller size of MP3 encoded audio files has also enabled these files to be shared by users across the Internet, since the transfer of these files takes an acceptable amount of time. Internet-based digital music access and distribution service businesses have appeared that provide various means for users to gain access to digital audio files.

In addition to music, many other types of audio content are now available in digital format, such as spoken-word content, news, commentary, and educational content. Digital files containing audio recordings of books being read aloud are available for download directly from their website.

At the same time, there is a very large installed base of stereo systems in households throughout the world. The majority of these systems are capable of producing high fidelity audio if the audio inputs into the stereo system are of high quality.

What is needed is a system that allows users to play all of the digital content that is stored on their PC, on their existing audio equipment. This system should include an audio content management system, and should allow the user to control and manipulate the content that is stored on the PC, at the stereo system.

This system should also provide the ability to stream audio from sources beyond the PC on the Internet. There should be a seamless interface that allows user to manage both locally cached content and Internet streams.

SUMMARY

An audio converter device and a method for using the same are provided. In one embodiment, the audio converter device receives the digital audio data from a first device via a local area network. The audio converter device decompresses the digital audio data and converts the digital audio data into analog electrical data. The audio converter device transfers the analog electrical data to an audio playback device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only:

FIG. 15 shows an isometric view of one embodiment of the PDA removed from the LAN adapter.

DETAILED DESCRIPTION

Figure 1:
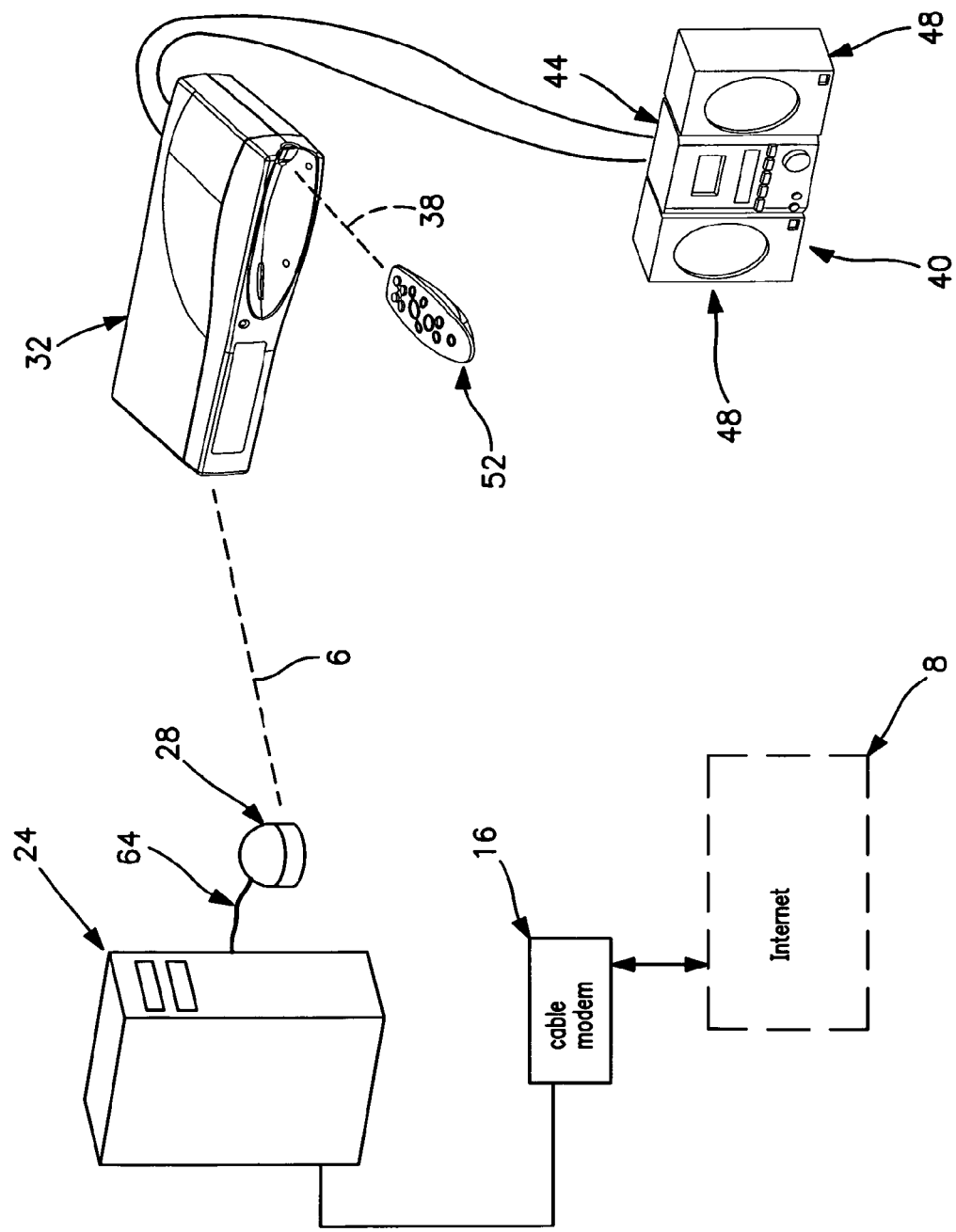
FIG. 1 shows a schematic of one embodiment of the digital streaming audio system hardware components.

An audio converter device and a method for using the same are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A set of definitions is provided below to clarify the present invention.

DEFINITIONS

The Internet is used interchangeably with the term web or worldwide web. Both of these are defined as the worldwide network of PCs, servers, and other devices.

Broadband connection is defined as a communications network in which the frequency bandwidth can be divided and shared by multiple simultaneous signals. A broadband connection to the Internet typically provides minimum upstream and downstream data-rates of approximately 200K or more bits per second. There are many different types of broadband connections including DSL, cable modems, and fixed and mobile wireless connections.

A Data Over Cable System Interface Specification (DOCSIS) modem is an industry standard type of cable modem that is used to provide broadband access to the Internet 8 over a coaxial cable physical layer that is also used for the delivery of cable TV signals (CATV). A Digital Subscriber Line (DSL) modem is also an industry standard type of modem that is used to provide broadband access to the Internet, but over conventional copper phone lines (local loops).

The term gateway, used interchangeably with broadband gateway, is defined as an integral modem and router, and may include hub functionality. The modem function is used to change voltage fluctuations on an input carrier line (a DSL line input or a cable TV input) into digital data.

Routers are devices that connect one distinct network to another by passing only certain IP addresses that are targeted for specific networks. Hubs allow one network signal input to be split and thus sent to many devices.

Gateway storage peripheral is defined as an add-on storage device with processing power, an operating system, and a software application that manages the downloading and storage of data. An example scenario for the use of a gateway storage peripheral is a system where a user has a DOCSIS modem and would like to add an always-on storage capability. The gateway storage peripheral is connected to the DOCSIS modem via a USB port or an Ethernet port in the DOCSIS modem. A gateway storage peripheral in combination with a DOCSIS modem or any type of broadband modem is considered a storage gateway system. A PC that is always left on and connected to an always-on gateway with a DSL or broadband cable connection is considered a storage gateway system.

The term "message" is defined as information that is sent digitally from one computing device to another for various purposes. The term "content" is used to mean the information contained in digital files or streams. For example, content may be entertainment or news, or audio files in MP3 format. "Data" is used to mean information such as digital schedule contents, responses from devices sent back through the system, or digital messages and email. "Content" and "data" are sometimes used interchangeably. "Client devices" are those devices that are not fully functional without a host device such as a personal computer.

Local Area Network (LAN) is defined as a network structure that includes two or more devices that can communicate with other devices utilizing a shared communication infrastructure, including wired network technologies, such as Ethernet, or wireless network technologies such as Institute of Electrical and Electronics Engineers (IEEE) 802.11b or HomeRF technology. Wireless LAN technology such as EEE 802.11b and HomeRF are based on the unlicensed 2.4 Ghz ISM (Industrial, Scientific, and Medical) frequency band and are well known the telecommunications and LAN industries. These networking technologies utilize Transmission Control Protocol/Internet 8 Protocols (TCP/IP) protocols. A LAN typically constitutes a group of interconnected devices that share a common geographic location and are typically grouped together as a subnet. A local network, for example, would be a home network where several computers and other smart devices would be digitally connected for the purpose of transferring content and data, controlling each other, sharing programming, or presenting data and content to a user.

Codec (Compression/Decompression algorithm) is a software application that is used to decode (uncompress) encoded (compressed) media files or streams. Most content is stored and sent in a compressed format so that the content files are smaller and thus take up less storage space and use less bandwidth when being transferred via the Internet. The content is then decoded at the playback device. For example, MP3 audio files are encoded and must be decoded by a microprocessor running the codec in order for the audio content to be presented to the user in an analog format.

HTTP is Hyper-text transfer protocol, the protocol used by Web browsers and Web servers to transfer files, such as text and graphic files.

Data-rate is defined as the data throughput of a telecommunications system or technology, and is measured in a quantity of bits per second, such as millions of bits per second (Mbps).

Overview of Operation

Figure 2:
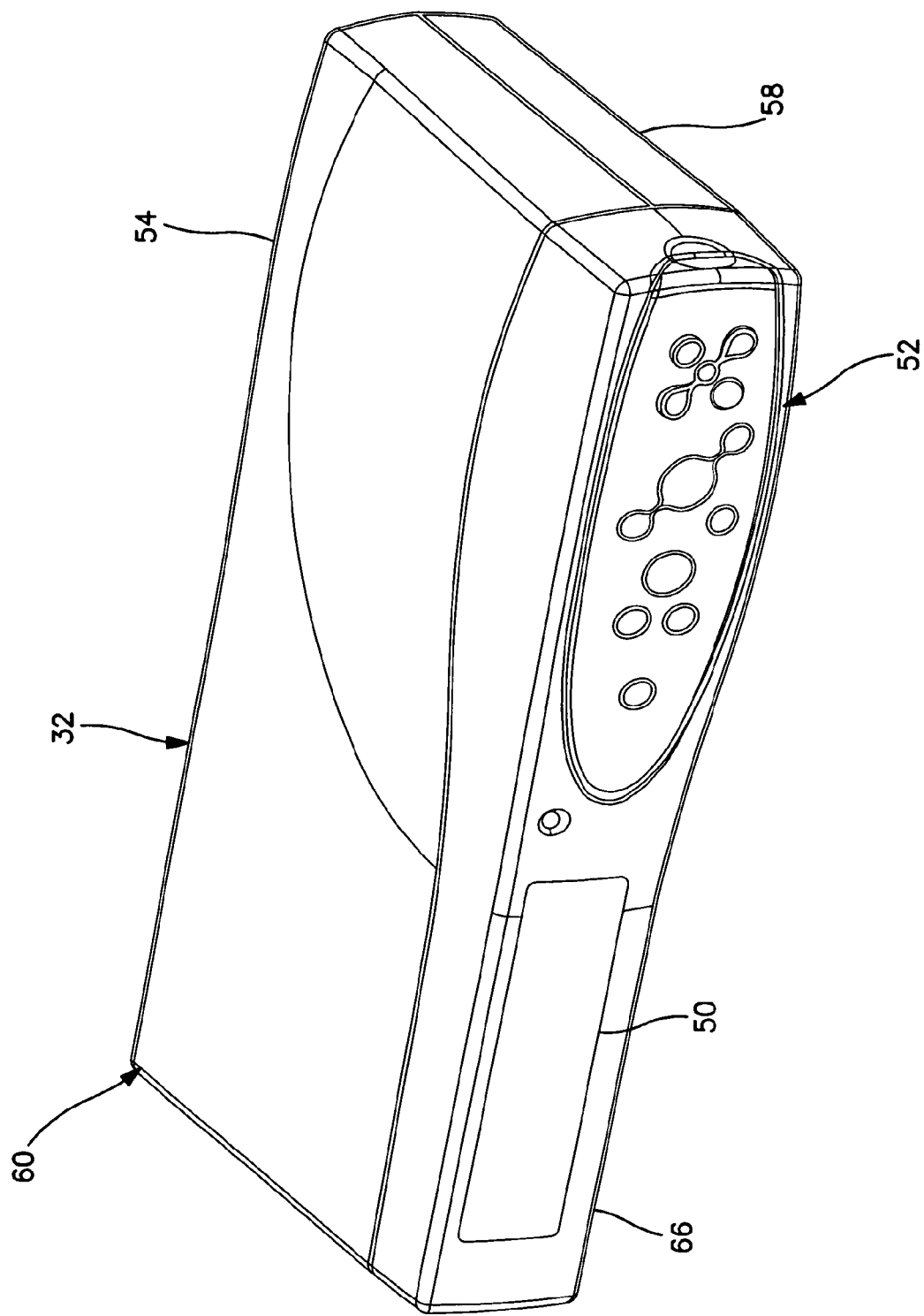
FIG. 2 shows an isometric view of one embodiment of a digital audio converter.
Figure 4:
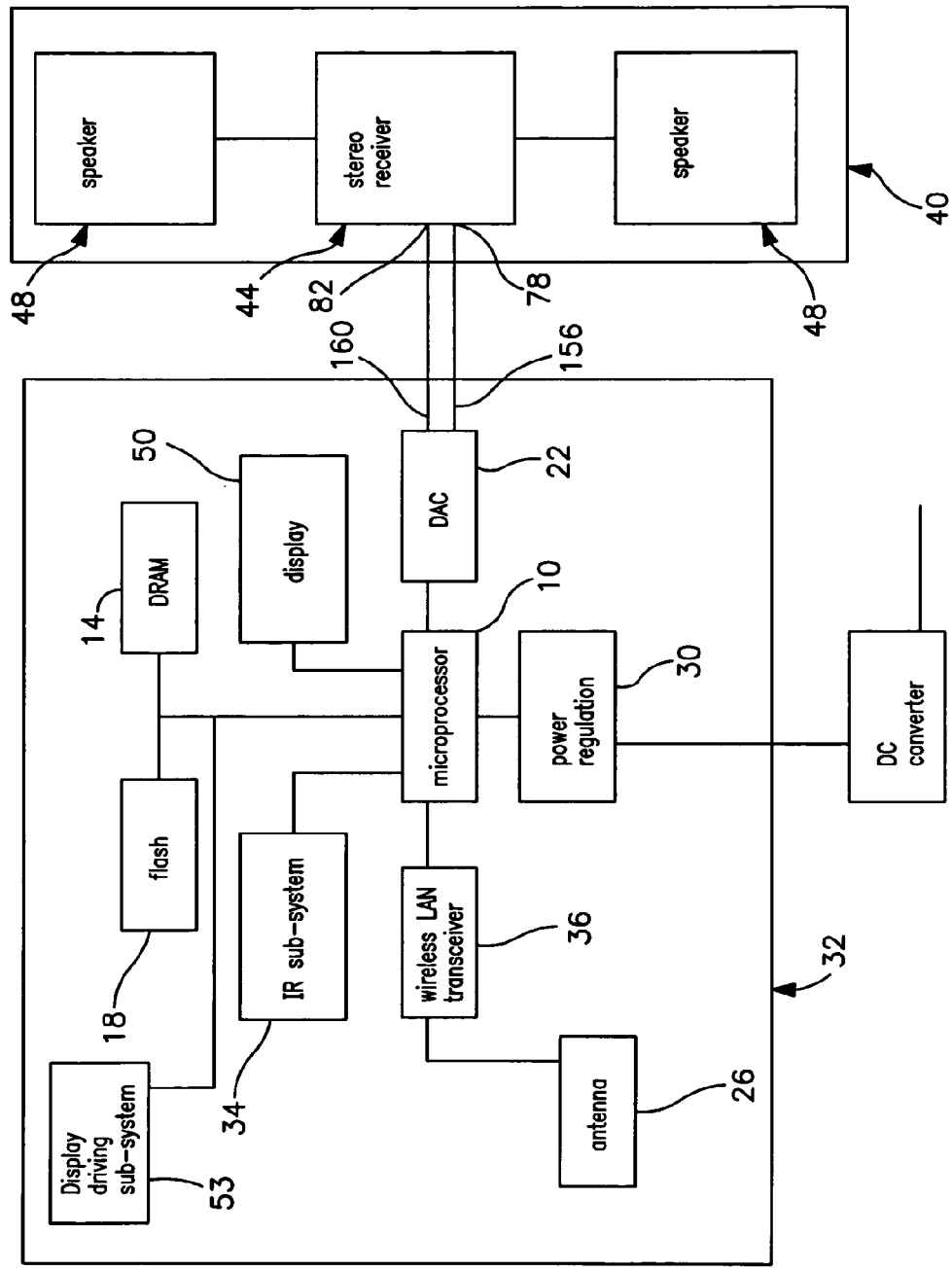
FIG. 4 shows a block diagram of one embodiment of a digital audio converter hardware components.

The fundamental operation of the digital streaming audio system involves LAN transmission of digital audio files 116 from a local source that is a personal computer (PC) 24, to a digital audio converter 32 that receives the stream and converts it into a signal that can be input into a conventional stereo system 40. Referring now to FIG. 1, the key hardware components in the system are PC 24 connected to the Internet 8. The PC 24 is also functionally connected via a USB connection 64 to a wireless radio frequency (RF) LAN access point 28, such that digital content from PC 24 is transmitted to nodes on the LAN. Digital audio converter 32, shown in FIG. 2, is located within communication range of the wireless LAN access point 28, and is connected to a conventional stereo receiver 44 via the right and left RCA jack inputs. Stereo receiver 44 is part of a stereo system 40 that includes a left speaker 48 and a right speaker 48. FIG. 4 is a block diagram of a portion of the digital streaming audio system including digital audio converter 32 and the stereo system 40, showing how left analog output 156 and right analog output 160 included in digital audio converter 32 are connected respectively to the left line input 78 and right line input 82 on existing stereo receiver 44. Digital audio converter 32 also includes a remote control 52 that communicates with digital audio converter 32 via an IR communication link 38. Stereo system 40 functions in the conventional way, pre-amplifying and amplifying the audio signals and delivering them to the left speaker 48 and the right speaker 48.

The function of the PC 24 in the digital streaming audio system is to acquire, store, manage, and serve digital audio content to digital audio converter 32. The PC 24 gains access to digital audio content several ways. In one embodiment the PC 24 is also connected to the Internet 8 via a broadband cable modem 16. Thus the PC 24 has access via content services to both downloadable digital audio files 116 such as MP3 formatted content files, as well as digital audio streams from Internet 8 servers. For example, some radio stations provide access to their programming via digital audio streams.

In other embodiments, PC 24 is connected to Internet 8 through a dial-up modem connection to an ISP, or Digital Subscriber Line (DSL), or a fixed wireless broadband connection.

Wireless LAN transceivers are capable of sending and receiving data using radio frequencies via a wireless data transfer protocol. Technology for such a LAN is currently available and includes the Symphony wireless networking access point provided by Proxim, Inc. of Sunnyvale Calif. LAN systems such as this are based on RF modulation centered on the 2.4 GHz frequency band. Such LANs have a practical range of approximately 150 feet and are capable of reaching most areas in an average sized house where a stereo system 40 and digital audio converter 32 are located. In another embodiment, the wireless LAN access point 28 is a PCI card that is located internal to the PC 24, with an external antenna. In another embodiment, the wireless LAN communication link 6 is provided using IEEE 802.11b protocols.

The function of digital audio converter 32 is to receive digital audio streams sent from the PC 24, decode and decompress the digital audio in real time, convert it from a digital format into a analog electrical signals, specifically a left analog audio signal and a right analog audio signal. Through the use of digital audio converter 32, the stereo system 40 is the output device for digital audio content that was initially stored on the PC 24 or on the Internet 8.

Digital audio converter 32 includes an LCD 50 that is used to display data relevant to the audio content being played, such as track titles. In one embodiment, digital audio converter 32 includes one set of control buttons on the remote control 52, which attaches onto to the enclosure 60 of digital audio converter 32. In another embodiment, control buttons are included on both an IR remote control 52 and integral to the main enclosure 60. The purpose of the control buttons is to provide a user interface for controlling the digital streaming audio system, as well as a tag button 620 used to maintain a record of certain audio content on the PC 24 for later use, and control of other features.

The control buttons include the conventional controls that are found on audio playback devices including power on/off button 600; track forward button 608 and track 15 backward button 612—for advancing through and selecting tracks for playback; menu button 652; play/pause button 604—for starting and pausing (stopping at point in the middle of a playback of an audio track); stop button 616—for stopping playback of audio content; tag button 620—for triggering the transmission of information about a currently playing digital audio content back through the system for delivery to the end user on a website or for delivery to the content creator or content originator; user-defined button 624—a button that may be associated with a variety of functions as selected by the user using the audio playback device setup GUI. A four-way navigation control 644 including navigate up button 628, navigate down button 632, navigate left button 640, and navigate right button 636. A select button is included in the center of the four-way navigation control 644. These control buttons are also shown on a remote control 52 in FIG. 6.

Mechanical Description

Figure 3:
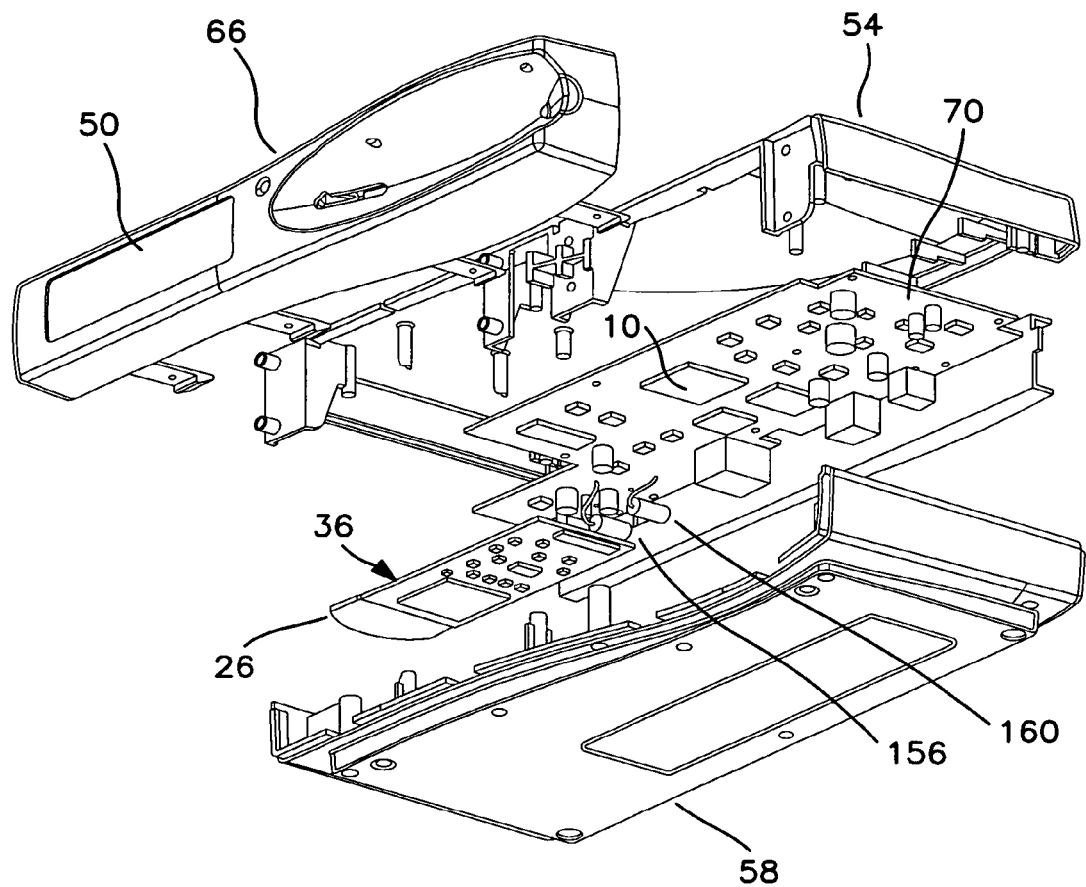
FIG. 3 shows an isometric exploded view of one embodiment of a digital audio converter.

Referring now to FIGS. 2 and 3, one embodiment of digital audio converter 32 includes a three-piece plastic injection-molded enclosure 60 including a top housing 54, a bottom housing 58, and a front bezel 66. Internal hardware also includes LCD 50 that contains an integral backlight so that the LCD 50 may be read in low light, a power regulation sub-system 30, an infrared (IR) receiver 34 and related circuitry, and a printed circuit board (PCB) 70 that contains the electronic components that constitute the functional data-manipulating aspect of digital audio converter 32. In one embodiment, the wireless LAN transceiver 36 antenna 26 is located internal to the digital audio converter 32 housing as shown in FIG. 3. The entire assembly is held together with threaded fasteners.

Figure 6:
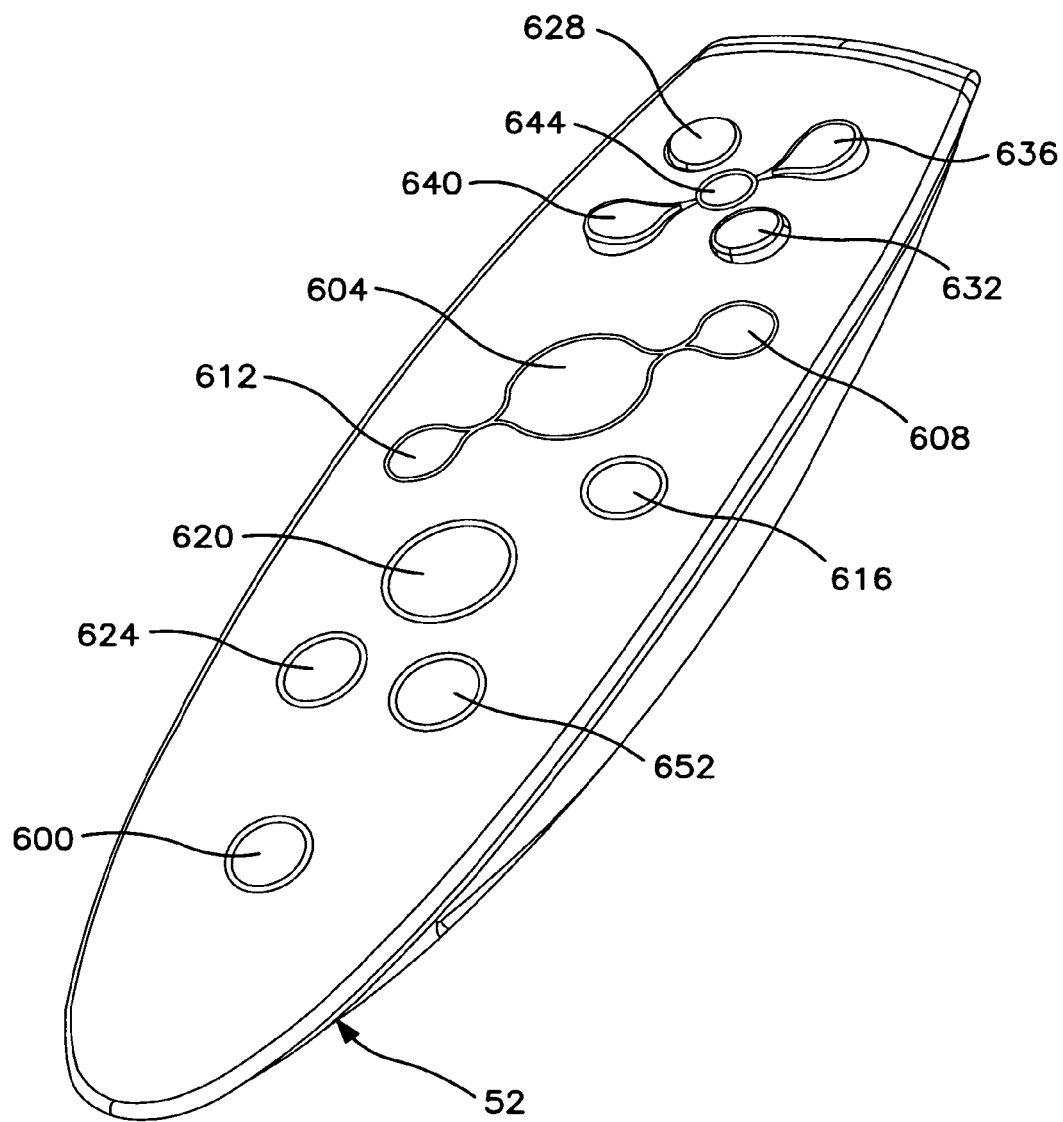
FIG. 6 shows an isometric view of one embodiment of a digital audio converter remote control.

The construction of the remote control 52 is a typical two-piece plastic shell construction as shown in FIG. 6. Internal hardware includes an infrared (IR) transceiver and batteries, as well as a printed circuit board that contains the electronic components that constitute the functional data-manipulating aspect of digital audio converter 32. In one embodiment, the remote control 52 is removably attached to the enclosure 60.

Electrical Description

FIG. 4 shows a block diagram of the electrical components in digital audio converter 32. PCB electrically connects components including a microprocessor 10 with dynamic memory (DRAM) 14, programmable (flash) memory 18 for storage of control firmware 100 when power is turned off, a power regulation sub-system 30, and a plurality of input/output terminals including an Ethernet port and a right analog output 160 and a left analog output 156. A wireless LAN transceiver 36 with associated antenna 26 is functionally connected to the PCB. PCB also functionally connects an infrared (IR) control sub-system 34 for processing IR commands from the remote control 52. Digital audio converter 32 also includes a digital-to-analog converter (DAC) 22 for converting the uncompressed digital information into analog signals that are presented at the standard left analog output 156 and right analog output 160 RCA connectors. A display driving sub-system 53 is also included for presenting text and graphical information to the user. Microprocessor 10 in combination with DRAM memory 14 executes instructions from its real time operating system 96 and control firmware 100.

In another embodiment, digital audio converter 32 includes a terrestrial broadcast tuner subsystem for tuning local AM and FM broadcast radio.

In another embodiment, power to the stereo system 40 is supplied via a switched power line from the converter box so that the system has the capability of turning the stereo on and off. The on/off function is controlled via software on the PC 24 or through the remote control 52, so that when the digital audio converter 32 is powered on, the stereo system 40 is also automatically powered on.

System Software Description

Figure 5:
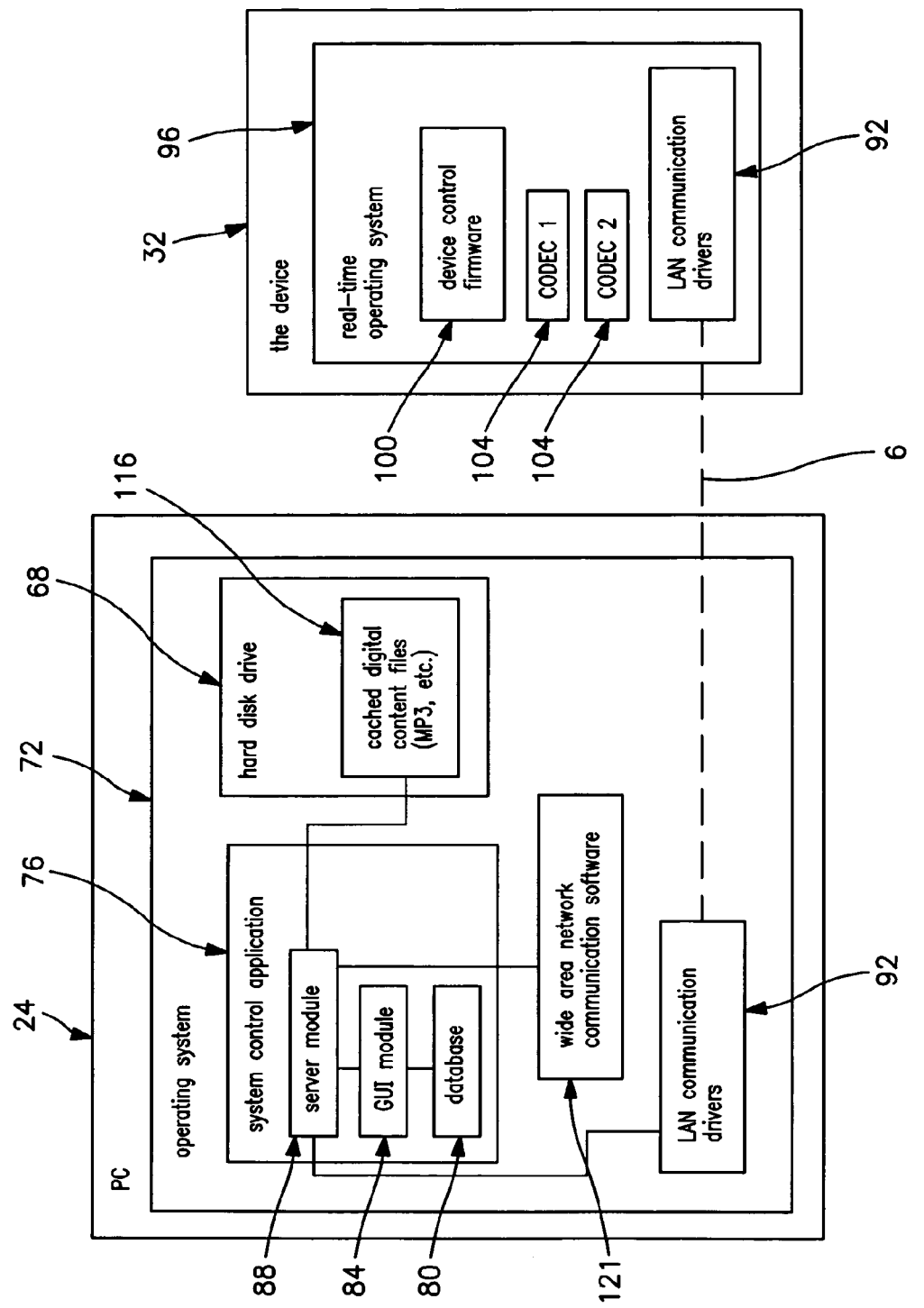
FIG. 5 shows a block diagram of one embodiment of the digital streaming audio system software components.

FIG. 5 displays the relevant software components of the digital streaming audio system. In one embodiment, the software required on the PC 24 includes an operating system 72, such as the WindowsXP operating system provided by Microsoft of Redmond, Wash. Wide area communication software 121 is also required for connecting to the Internet 8, which is typically provided as drivers in operating system 72. LAN communication drivers 92 are required for connecting the PC 24 to the LAN. Digital audio files 116 such as MP3 formatted files are stored on the hard disk drive 68.

Software Module—System Control Application

The system control application 76 is software executing on PC 24 that manages communication and streaming from PC 24 to digital audio converter 32. System control application 76 includes a server module 88 that is a Java application. System control application 76 also includes a database module 80 that is written to or accessed by server module 88, and a graphical user interface (GUI) module 84, that provides a user interface for setting up content to be streamed to digital audio converter 32 and played on the stereo system 40. In one embodiment, the GUI module 84 is a native Windows 32-bit application.

In another embodiment, the GUI module 84 is available on a web page, implemented as HTML and Java Server Pages (JSP).

The GUI module 84 provides a user interface that is used to organize audio content into lists. The lists that are created using the GUI module 84 at PC 24 are accessible at digital audio converter 32 via the use of control buttons on remote control 52 and visual output on LCD 50.

Figure 7:
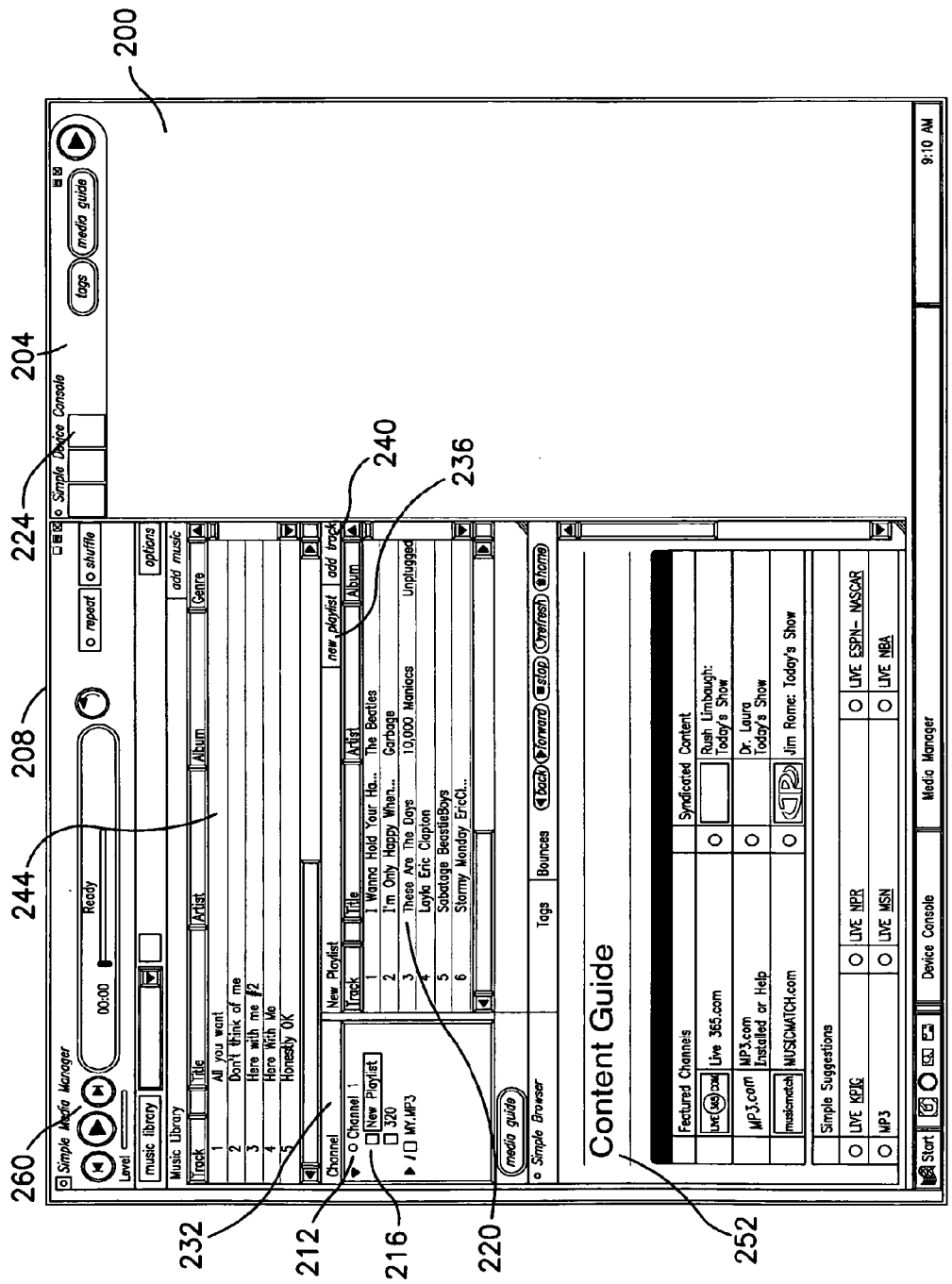
FIG. 7 shows one embodiment of a PC desktop with the console and media manager GUI.

FIG. 7 shows a PC desktop 200 with the media manager GUI 208 running. The console 204 is a GUI element that appears when server module 88 is running Console 204 shows icons for any devices that are actively communicating on the LAN. Digital audio converter icon 224 is shown present on console 204. Media manager GUI 208 is launched from digital audio converter icon 224 on console 204 by clicking on digital audio converter icon 224 on console 204 with a mouse.

Figure 9:
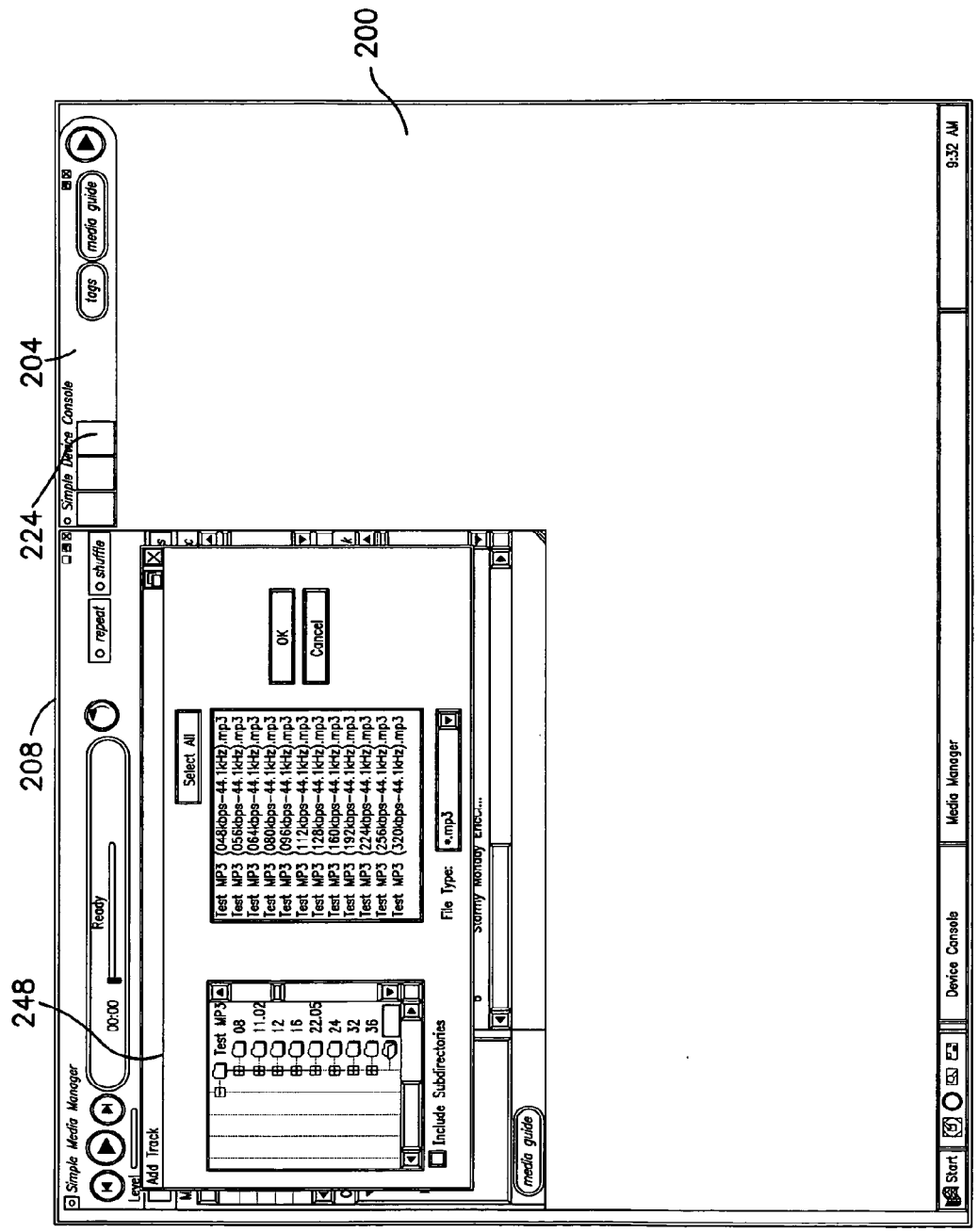
FIG. 9 shows one embodiment of a PC desktop with the media manager GUI open with a dialog box.

The media manager GUI 208 features a three-level nested list structure. The three levels are labeled as channels 212, playlists 216, and tracks 220. Channels 212 are lists of playlists 216, and playlists 216 are lists of tracks 220. Track 220 is a GUI representation of a locally cached digital audio file 116 or a digital audio stream from Internet 8. Channels 212 can be added by right-clicking with the mouse on the channel bar 232. A menu is displayed that allows the user to create and label channel 212 by typing in text. Playlists 216 can be added to channels 212 by right clicking on a channel 212 label and selecting the option to add playlist 216. Playlists 216 can also be added to channels 212 by left clicking with the mouse on the add playlist button 236. Tracks 220 can be added to playlists 216 by using the mouse to click on the add track button 240. FIG. 9 shows the result of left clicking on add track button 240. A conventional Windows dialog box 248 is displayed. The left side of dialog box 248 includes a navigation window that allows the user to navigate to any directory on local PC 34 or to any other PC that are accessible on the LAN.

Tracks 220 can also be added to playlists 216 by dragging and dropping an audio file icon from a window on the desktop, onto track 220 list. Tracks 220 can also be added to playlists 216 by dragging and dropping track 220 icon from the music library 244. Music library 244 is a window that shows all of the digital audio files 116 stored on the local hard disk drive 68 that can be decoded by digital audio converter 32. A software agent included in server module 88 of system control application 76 searches hard disk drive 68 for compatible audio files, enters the names and locations of those files into database module 80, and places labels of the files in music library 244.

Figure 8:
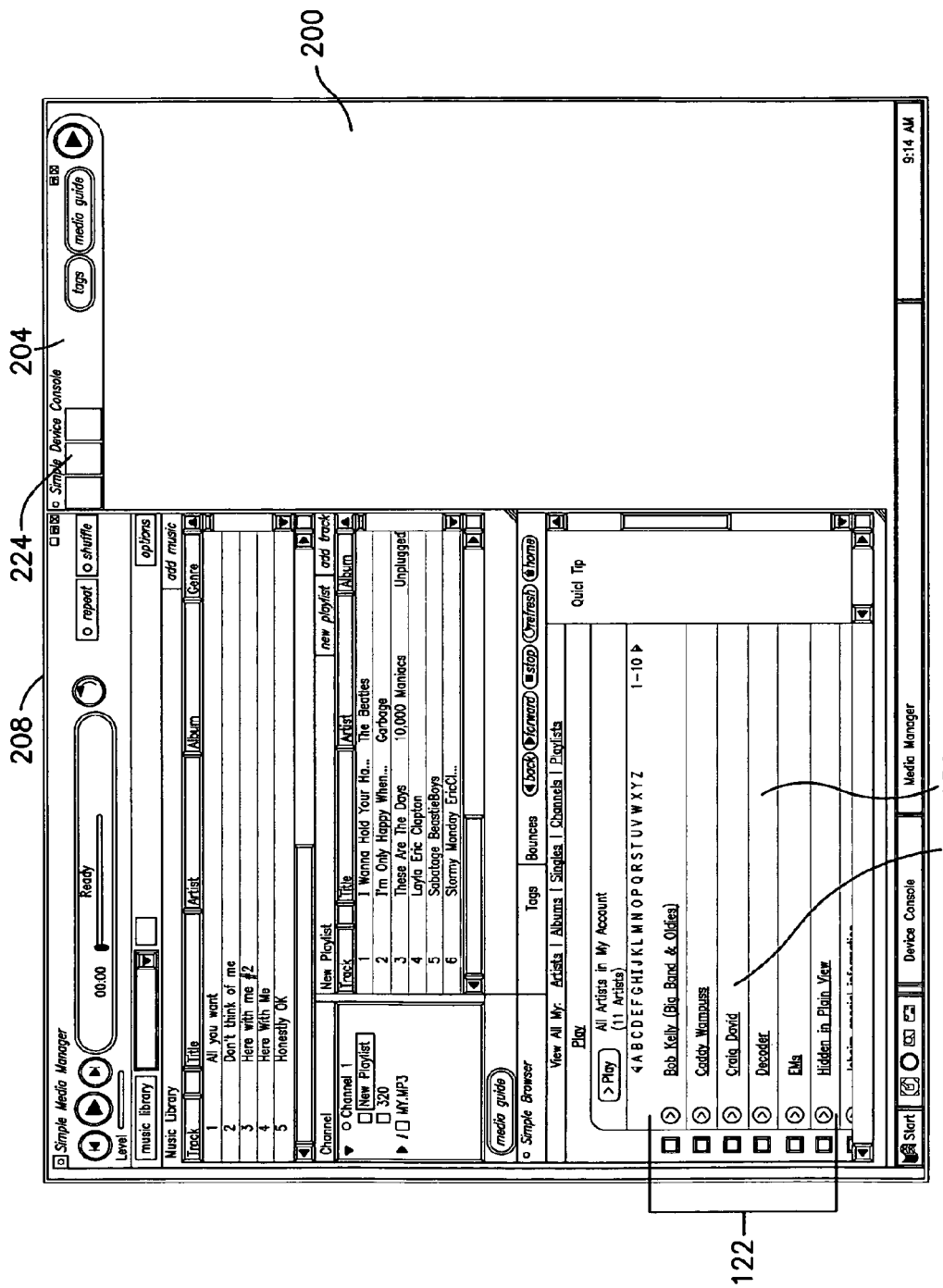
FIG. 8 shows one embodiment of a PC desktop with the mini-browser open to a content portal.

Audio content services are also available through online services accessed through a browser interface. FIG. 8 shows a web-based content selection guide 252 that provides the ability to make a playlist online. The online digital audio files associated with online playlist titles 99 in the online playlist 122 are streamed to digital audio converter 32 via PC 34 and wireless LAN communication link 6. Server module 88 includes software that interfaces with the protocols of each online audio service provider to allow online playlists 122 to be downloaded and transferred into database module 80. Thus, playlist structures and playlist titles created online using the web-based content selection guide 252 are available and can be interacted with by the user with the user interface at digital audio converter 32.

Referring now to FIG. 7, media manager GUI also includes a PC audio device control interface 260, which includes the conventional controls for controlling an audio player device. PC audio device control interface 260 allow the user to control digital audio converter remotely from PC 24. Using a preference setting, the audio sound playing that is controlled by PC audio device control interface 260 can be directed to the local PC 24 speakers. In other words, the digital audio file 116 that is selected to be played can be decoded locally at PC 24 and played on PC 24 speakers.

Device Software—Digital Audio Converter Operating System

In one embodiment digital audio converter 32 operates using VxWorks, a real-time operating system 96 provided by WindRiver Systems. Digital audio converter 32 control firmware 100 is a software application that is run on real time operating system 96 and manages the processing of messages from the IR sub-system 34, communication with system control application 76 via LAN 6, stream buffering, and decoding of digital audio.

Device Software—Device GUI

Figure 10:
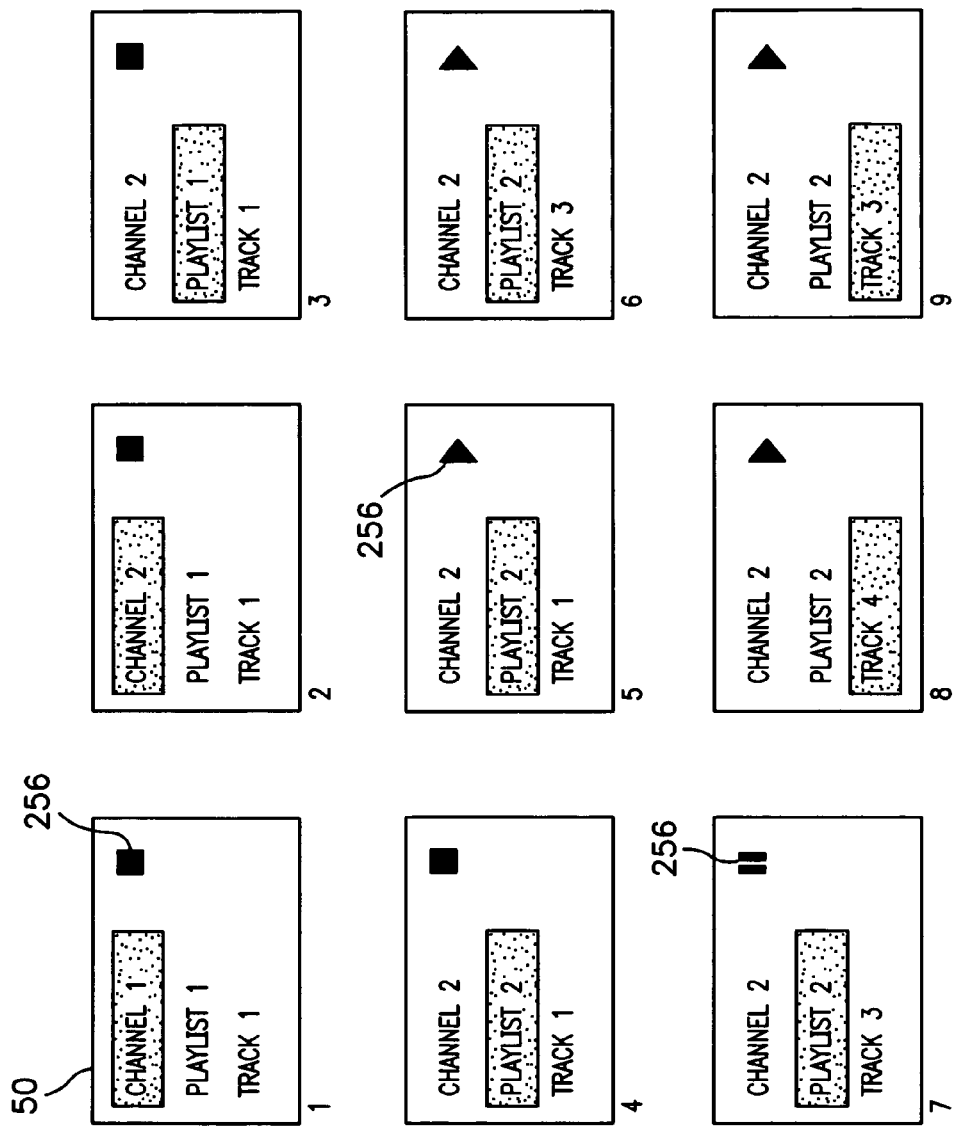
FIG. 10 shows a flowchart of one embodiment of the GUI at digital audio converter.

A GUI is provided at digital audio converter 32. The GUI is operated using remote control 52 and LCD 50. FIG. 10 shows a graphical user interface flow chart to describe the user interface structure. The three levels of content organization provided by the media manager GUI 208 correspond to three display lines on digital audio converter 32 LCD 50. The display lines are manipulated by using the four-way navigation control 644 on remote control 52. Referring now to FIG. 10, each screen (1-9) is described below:

1. Initial state of digital audio converter 32 is shown. The top line of text shows the current channel, the second line of text shows the current playlist, and the third line of text shows the current track. Digital audio converter 32 status icon 256 shows the filled square symbol, which is the conventional symbol for a playback system that is in "stop" mode, i.e., nothing is playing. The channel level is depicted as the current channel by being graphically reversed (text is white with black background).

2. This screen shows the result of activating the right navigation button. The channel level label changes to "channel 2". The labels at the playlist level and the tracks level also update to reflect the new items in "channel 2".

3. This screen shows the result of activating the down navigation button. The highlight moves from the channel level to the playlist level.

4. This screen shows the result of next activating the right navigation button. The playlist level changes to "playlist 2", the next playlist organized under "channel 2". The track level text also updates to reflect the actual first track included in "track 1" under "playlist 2".

5. This screen shows the result of next activating the play/pause button on the remote control 52. "Track 1" begins to play. Status icon 256 changes from a black square to a right-pointing triangle.

6. This screen shows the result of next activating the next track button on digital audio converter 32 remote control 52. "Track 3" begins to play.

7. This screen shows the result of next activating the play/pause button while a track is playing. The track stops playing and status icon 256 is the "pause" icon.

8. This screen shot shows the result of a few different actions. First, the play/pause button was activated, thus "Track 3" begins to play where it left off when the play/pause button was activated. Next, the right navigation button is activated once. The track line advances to show the next track, or "Track 4" in "Playlist 2". "Track 3" continues to play. This feature allows the user to browse through the channel/playlist/track list structure while continuing to listen to a currently playing track.

9. This screen shows the result if no other buttons are activated for six seconds. The display reverts back to display the channel, playlist, and track that are currently being played.

The corresponding other buttons, such as the up navigation and left navigation buttons move the highlight to the corresponding label.

Device Software—CODECs

In one embodiment, digital audio converter 32 includes the Fraunhofer CODEC 104, licensed for use by Thomson Electronics for decoding the digital audio file that is streamed to it from PC 34. CODEC 104 is an executable file stored in memory, launched by control firmware 100, executed by real time operating system 96 running on digital audio converter 32. Digital audio converter 32 may store multiple CODECs in memory 18 for decoding variously formatted digital audio files 116 that may be selected by the user. For example, the WindowsMedia CODEC, provided by Microsoft may be stored in memory 18 at digital audio converter 32.

Software Functions—Communication/Message Processing

The communication and streaming functions of the system will now be described. A user uses remote control 52 to control the function of digital audio converter 32. Button activations on remote control 52 result in IR pulse codes that are received by the IR receiver sub-system 34 in digital audio converter 32. These IR pulse codes are deciphered by the computer sub-system in digital audio converter 32 and are converted into messages that are interpreted by the control firmware 100 running on digital audio converter 32 to invoke action at digital audio converter 32. Other IR pulses codes from remote control 52 are processed by control firmware 100 and are converted into XML-based messages and sent via HTTP requests to PC 24 via the wireless LAN. These messages are interpreted by server module 88 running on PC 24 and specific actions are initiated.

For example, assume that digital audio converter 32 is currently in play mode, that is, a first digital audio file 116 is currently being streamed to digital audio converter 32, decoded, and corresponding analog signals are being produced at the analog outputs. The user activates forward one track button 608 and IR pulse code is generated by the IR sub-system 34 in remote control 52. IR pulse code is received by the IR sub-system 34 in digital audio converter 32 and is interpreted by control firmware 100 running on digital audio converter 32 as a "forward one track" command. XML message expressing the "forward one track" command is sent by microprocessor 10 to system control application 76 on PC 24. The "forward one track" XML message is transmitted by wireless LAN transceiver 36 via the LAN, by an HTTP request, to wireless LAN access point 28 connected to PC 24. The HTTP request containing the "forward one track" message is received by server module 88, which accesses the next track name and location of the file associated with the next track name, in database 80. The text string for the track name is expressed in an XML message and is sent to back to digital audio converter 32. This text string is interpreted by control firmware 100 running at digital audio converter 32 and the text string is then displayed on LCD 50.

The preferred embodiment also enables the streaming of digital audio files 116 with a buffer management function that controls the flow of portions of the digital audio file 116 from PC 24 into a local DRAM memory 14 of digital audio converter 32. The buffer management function insures that the local DRAM memory 14 buffer is filled as the contents of DRAM 14 are decoded by microprocessor 10 executing the CODEC 104.

Other Features—Downloadable Firmware and CODECs

An aspect of control firmware 100 on digital audio converter 32 is the ability to receive and install new CODECs 104 via LAN communication. link 6. Non-volatile flash memory 18 in digital audio converter 32 is partitioned into two sectors, flash memory sector A and flash memory sector B. A control bit determines the flash memory sector from which operating system 96 and control firmware 100 is loaded. In an initial state, operating system version A and control firmware version A are loaded into DRAM 14 upon boot of digital audio converter 32. Digital audio converter 32 is functional. New versions of the software, operating system B and control firmware B are sent to digital audio converter 32 via wireless LAN communication link. Operating system B and control firmware B are then written into flash memory sector B. A checksum is provided to insure that the exact image of the software has been successfully written into flash. If the checksum at digital audio converter 32 matches the control checksum, the control bit is changed to cause the system to boot from flash sector B. Either a device reboot command is initiated from the server module 88, or a reboot is initiated at digital audio converter 32. Operating system B and control firmware B are then loaded into DRAM. Digital audio converter 32 operates with new versions of the software. The next new version of software is loaded into flash sector A. Each successive revision of software is loaded into the flash sector A or flash sector B that is not the current bootable flash memory sector.

Other Features—Tagging

Figure 11:
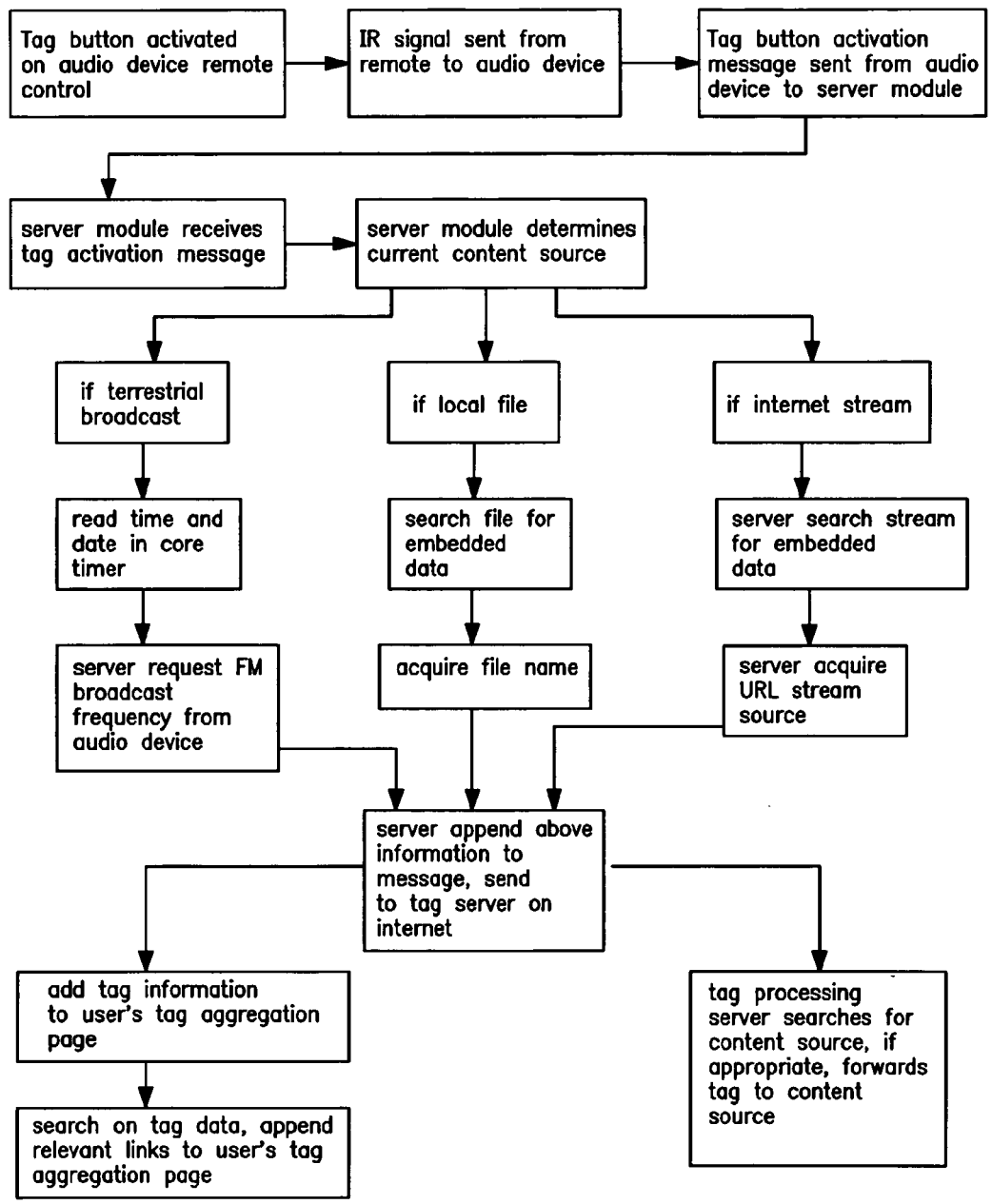
FIG. 11 shows one embodiment of a tag sequence flowchart.

Because LAN technology is a two-way interconnection technology, responses from digital audio converter, in one embodiment, may be sent back through the digital streaming audio system and processed and presented to the user and other interested entities at both PC 24 and on the web. FIG. 6 shows tag button 120 on remote control 52. FIG. 11 is a flow chart of the tagging sequence. During the playing of digital audio files 116, activation of tag button 620 by the user results in a transmission of an XML message back through LAN informing system control application 76 server module 88 that tag button 620 was activated. Server module 88 then compiles and transmits tag XML message to a tag storage and processing server. The information in tag XML message may include but is not limited to: metadata or meta-tags (ID3 data) included in the file or stream (characters or images); the file name if content is a file; the URL or IP address of the stream if content 116 is a stream; time; date; and user identifier. The transmission of tag XML message can have different results. The information in the message may be formatted as a readable text message and presented to a user on a personal tag aggregation web page. In this scenario, the user has signed up with an account and receives a password for entry into protected tag aggregation web page.

For the tagging function, the server module 88 should have access to accurate time and date information. Server module 88 includes a function that accesses a server on Internet 8 where accurate time and date data is available, and these quantities are stored locally by server module 88 in system control application 76 database module 80.

Other Features—User-Defined Button

A user programmable user-defined button 624 is provided on remote control 52. The function of user-defined button 624 can be changed based on a menu of items available via GUI module 84. For example, a user-defined menu may be accessible via a left mouse click on digital audio converter icon 224 on console 204. The left mouse click on digital audio converter icon 224 causes a preference menu to appear. Some possible functions for user-defined button 624 are: delete currently playing track from the current playlist; purchase the currently streaming digital audio file 116 (if it is a sample digital audio file); shuffle the tracks in the existing playlist; repeat the current playlist, if the active level is the playlist level; repeat the current channel if the active level is a channel.

Use of the System

The PC 24 downloads several digital audio files 116 through the Internet 8 during the night and stores them on hard drive 68. At some time during the day, the user builds a playlist 216 of the digital audio files 116 to be played on his/her stereo system 40. Using digital audio converter 32 and remote control 52, the user requests to listen to the digital audio files 116. This information is relayed to the PC 24. The PC 24 then sends the audio content to the stereo system 40 where it is played. The user continues to manipulate the playlist 216 through the use of remote control 52 and tags certain songs that he/she finds appealing. The user later returns to the PC 24 and builds a new music playlist 216 from the newly downloaded digital audio files 116.

Alternative Embodiments

Figure 12:
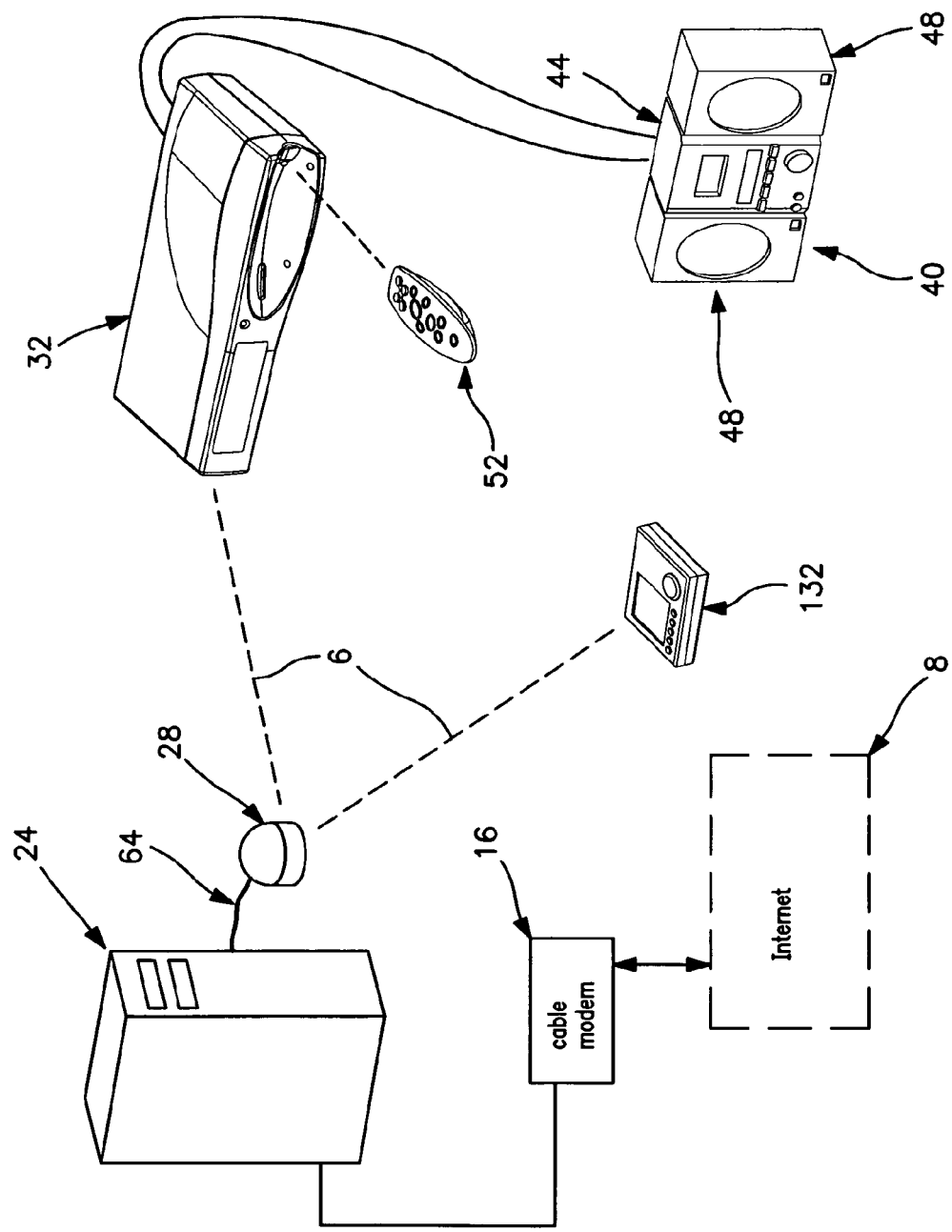
FIG. 12 shows a schematic of one embodiment of a digital audio converter with alarm clock function.

FIG. 12 shows an embodiment of the invention used to perform the functions of an alarm clock for use with a stereo system 40. The system includes an alarm clock controller 132 such as the one illustrated in FIG. 13. The alarm clock controller 132 includes a wireless LAN transceiver and the functional components required to allow the alarm clock remote controller 132 to operate as a node on the wireless LAN. The user can input a wake-up time into a PC 24 using a GUI or on alarm clock controller 132, which is sent, via the LAN communication link 6, to digital audio converter 32. Digital audio converter 32 may include a switched AC power conversion function that is used to switch on the stereo receiver 44 at the specified time in order to wake up a person sleeping in the room. The audio content that is played on the stereo at the time of wake-up can be preselected according to the users preferences. The alarm clock controller includes several buttons used to perform such functions as inputting a wake up time, tagging a web page, or turning the stereo off (snooze button). The alarm clock controller 132 includes a display 312 and several control buttons 308 used to perform such functions as inputting a wake up time and tagging digital audio.

In an alternative embodiment, the alarm clock controller includes an IR transceiver and other necessary components for establishing an IR communication link to digital audio converter 32. The IR communication link to digital audio converter 32 is used here instead of a wireless LAN communication link to the PC 24. The alarm clock controller module retains the same functionality as previously described, but must communicate with the system via digital audio converter 32. In a further embodiment, digital audio converter 32 remote control 52 functions as the alarm clock controller. The user can use the remote control 52 to set the wake-up time for the stereo to turn on and/or use the remote control 52 to switch the stereo off (snooze function). The user-defined button can be programmed by the user to function as a snooze button.

Figure 14:
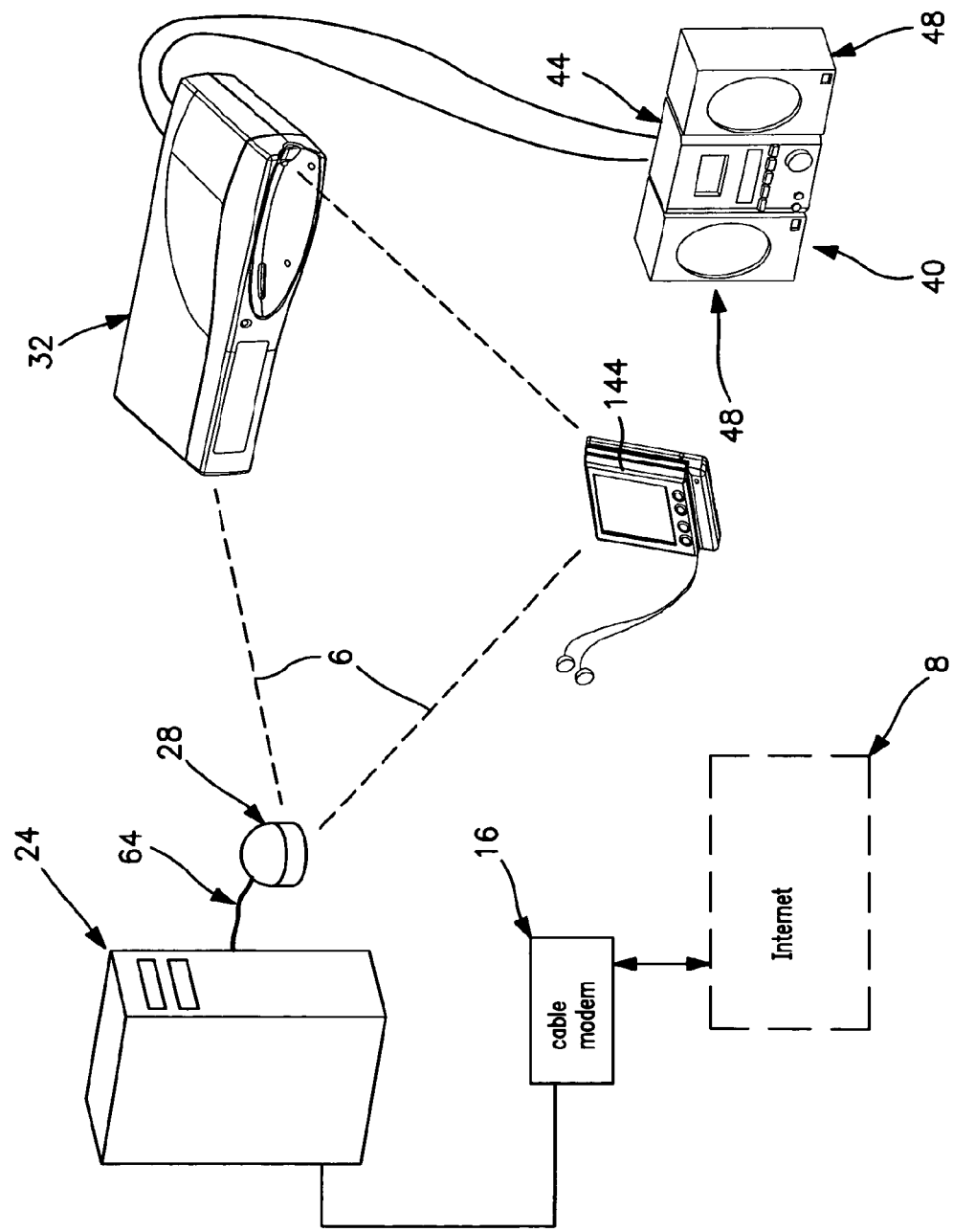
FIG. 14 shows a schematic of one embodiment of a digital streaming audio system incorporating a PDA with an attached wireless LAN adapter module which functions as the system controller and, or player device.

FIG. 14 shows an embodiment of the invention where a PDA 144 docked with a wireless LAN adapter 148 is used as an enhanced controller and/or player used with the system. FIG. 15 shows the PDA 144 removed from the wireless LAN adapter 148. The PDA 144 is used as the system controller and is used to manage the audio content that is delivered to the stereo by manipulating software on the PC 24 through a wireless LAN communication link to the PC 24. For example, the user can create or edit a playlist that is stored in the database module 80 on the PC 24, by using a browser GUI on the PDA 144. The PDA 144 can be similarly used to perform functions such as volume control, song skip, and pause. Furthermore, earphones can be connected to the wireless LAN adapter 148 through an audio out jack and the wireless LAN adapter 148 can be used to play audio content stored on the PC 24. An audio data stream from the PC 24 is sent to the wireless LAN adapter 148, where it is decoded and converted into an analog audio signal that is sent to earphones. In this effect, the wireless LAN adapter 148 is functioning as digital audio converter 32, but has the added advantage of being portable. A custom user interface application on the PDA 144 is used as the user interface.

Figure 13:
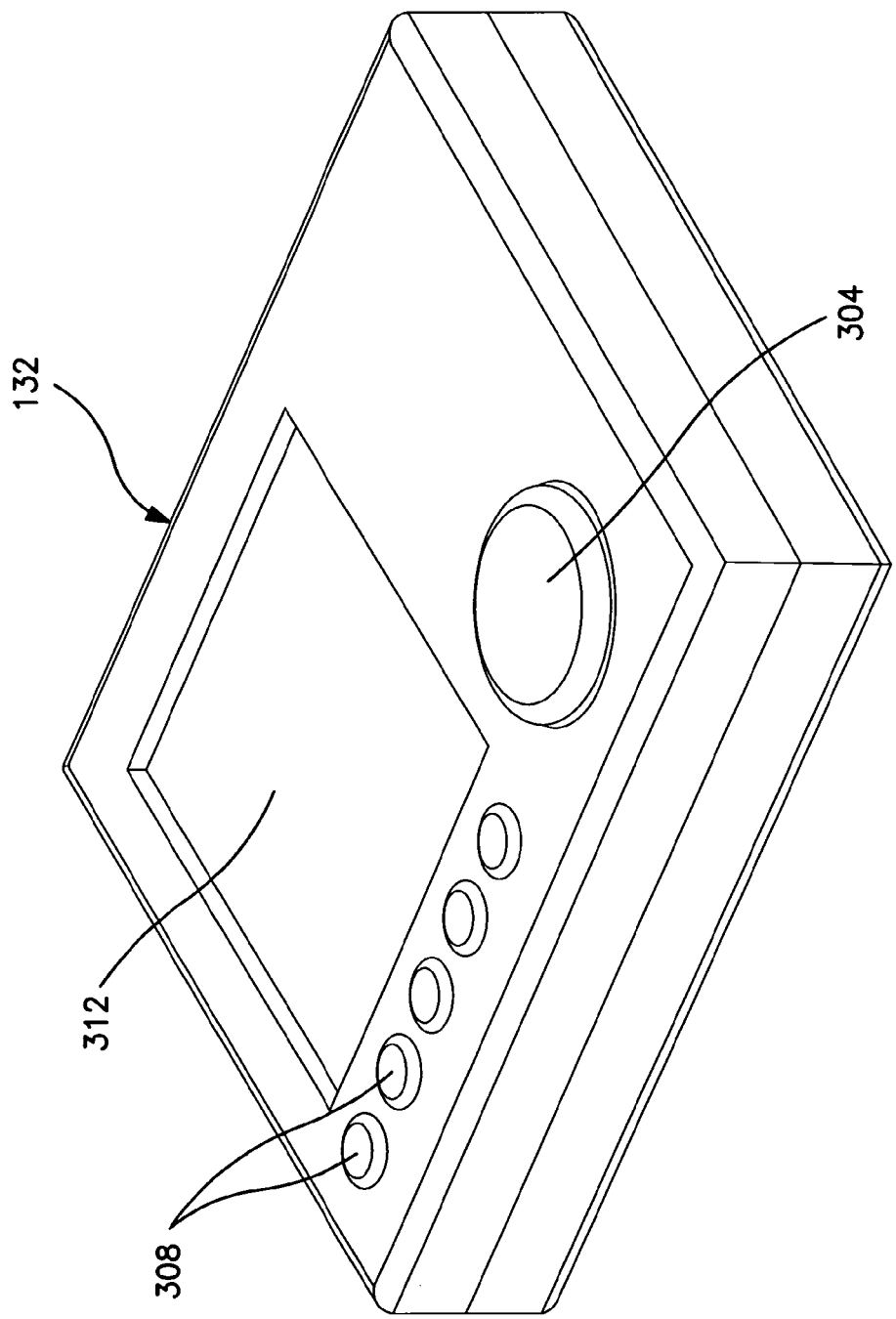
FIG. 13 shows an isometric view of one embodiment of the alarm clock controller.

The PDAs that are included in this system are PDAs that are currently sold as standalone PDA devices such as the Palm III, made by Palm Inc. FIG. 13 shows a generic PDA. By docking a PDA with the wireless LAN adapter, the PDA essentially becomes a node in the LAN established by the wireless LAN access point 28 connected to the PC 24. Through the use of the wireless LAN adapter, in conjunction with software on the PDA 144 and software on the PC 24, the PDA can send data to and receive data from the PC 24. FIG. 14 shows a PDA docked with a wireless LAN adapter 148. Electrical contacts on the rear end of the PDA make contact with electrical contacts 608 on the wireless LAN adapter 148 in order to establish a data communication link. There is a printed circuit board that contains the electronic components that constitute the functional data-manipulating aspect of wireless LAN adapter. Batteries are included to supply power to the wireless LAN adapter 148. The wireless LAN adapter further includes an audio output jack. In the preferred embodiment, the antenna is located internal to the PDA, mounted to the printed circuit board.

The PDA can also be incorporated into the system by using onboard IR capabilities. In this scenario, the PDA would communicate with the system via an IR communication link to the Wireless LAN-to-audio converter and would be used to perform similar functions to those of the remote control 52 described in one embodiment.

In another embodiment, a PDA is used that contains the processing power to decode and convert digital audio files. An example of such a PDA is the Compaq iPaq, manufactured by Compaq Computer. In this case, a wireless LAN Compact Flash transceiver card can be added to the CompactFlash card slot on the iPaq. A streaming player software application is also installed on the PDA that allows the PDA to interconnect to they system control application 76 on the PC 24 as if it were digital audio converter 32. A GUI on the PDA allows the user to select playlists and control the streaming of digital audio files to the PDA.

Home PC 24 to Stereo Player System has several permutations that have not yet been explicitly mentioned, but are implied: the system can be wholly controlled through the PC 24 and can be used without the use of a remote control 52 and/or a PDA; digital audio converter 32 can be internally incorporated into a new stereo device; the buttons on digital audio converter 32 can be regarded as optional; the switched power line on digital audio converter 32 can be regarded as optional; the wireless LAN adapter can be internally incorporated into a new PDA device; the audio in/out jack on the HRF Adapter Sled Module and its associated functions can be regarded as optional; HRF antennas can be located internal or external to digital audio converter 32s they serve.

In another embodiment the LAN connection between the PC 24 and device is Ethernet. In a different embodiment, the LAN connection between the PC 24 and digital audio converter 32 is an networking technology that uses the existing phone lines in the home as the physical layer. In yet another embodiment, the LAN connection between the PC 24 and digital audio converter 32 is a networking technology that uses the existing AC powerlines in the home as the physical layer.

In another embodiment, a residential storage gateway or a storage gateway system is used in place of or in addition to the PC 24 to run the system control application 76, connect to the Internet 8, and store file based content. In another embodiment, the system control application 76 including server module 88, database module 80, and GUI module 84 can be run on a set-top box that includes a cable modem and a hard disk drive and can perform the same functions.

An audio converter device and a method for using the same have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:
1. A system comprising:
   a storage gateway device having an associated content management system configured to communicate a play list for accessing one or more of a plurality of digital media files to a client converter device in communication via a local area network with the storage gateway device, the client converter device adapted to display a representation of the play list received from the storage gateway device, wherein the client converter device is connected to the storage gateway device only by the local area network;
   wherein commands for initiating playback via the client converter device of one or more digital media files represented on the displayed representation of the play list come from a remote control device;
   wherein the client converter device further comprises:
      a volatile memory buffer to store portions of a digital media file requested to be played when transmitted to the client converter device from the storage gateway device via the local area network; and
      a non-volatile memory partitioned into at least two sectors, wherein the client converter device includes a control bit that indicates which sector of the at least two sectors from which an operating system and control firmware is loaded;

a microprocessor to convert portions of the digital media file as stored in the volatile memory buffer into a format usable by a playback system; and a buffer management function to control flow of the portions of the digital media file requested to be played from the storage gateway device to the client converter device to permit filling of the volatile memory buffer as portions of the digital media file already received from the storage gateway device and stored in the volatile memory buffer are being converted by the microprocessor.

2. The system as recited in claim 1, wherein a request to initiate playing of one or more digital media files represented on the displayed representation of the play list comprises a mark-up language formatted message.

3. The system as recited in claim 2, wherein the request comprises an HTTP request message.

4. The system as recited in claim 1, wherein the remote control device is configured to transmit commands to the client converter device using an IR protocol.

5. The system as recited in claim 1, wherein the remote control device is configured to transmit commands to the client converter device using a RF protocol.

6. The system as recited in claim 1, wherein the remote control device comprises a personal digital assistant.

7. The system as recited in claim 1, wherein the play list comprises digital media files stored in a memory associated with the storage gateway device.

8. The system as recited in claim 1, wherein the play list comprises digital media files stored on a web-based server accessible to the storage gateway device via a wide area network.

9. The system as recited in claim 1, wherein the remote control device is configured to transmit commands to the client converter device to cause the client converter device to transmit via the local area network to the storage gateway device a request to initiate playback via the client converter device of one or more digital media files represented on the displayed representation of the play list.

10. The system as recited in claim 1, further comprising a static buffer having one or more stored digital media files previously received from the associated content management system.

11. The system as recited in claim 10, wherein before the plurality of digital media files are accessed from the associated content management system, the static buffer is searched to locate one or more files from the playlist.

12. The system as recited in claim 1, further comprising a database having stored digital media files, wherein before the plurality of digital media files are accessed from the associated content management system, the database is searched to locate one or more files from the playlist.

13. The system of claim 1, wherein the client converter device is further configured to:

receive new versions of the operating system and the control firmware via a wireless local area network communication link;

load the new versions of the operating system and the control firmware to a sector of the non-volatile memory not indicated by the control bit; and after verification of the new versions of the operating system and the control firmware, change the control bit to indicate that the client converter device is to load the operating system and control firmware from the sector of the non-volatile memory associated with the new versions of the operating system and the control firmware.

14. A storage gateway device comprising:

a content management system containing information regarding a plurality of digital media files from which a play list can be created;

an interface configured to communicate only via a local area network with a client converter device, wherein the client converter device is adapted to display a representation of the play list;

wherein the client converter device includes a non-volatile memory partitioned into at least two sectors, wherein the client converter device includes a control bit that indicates which sector of the at least two sectors from which an operating system and control firmware is loaded; and wherein the interface is further configured to communicate portions of selected digital media files from the storage gateway device to the client converter device, wherein flow of the portions of the selected digital media files communicated to the client converter device is controlled by a buffer management controller, wherein the buffer management controller is configured to control flow of the portions of the selected digital media files to permit filling of a volatile memory buffer at the client converter device as the portions of the selected digital media files already received from the storage gateway device and stored in the volatile memory buffer are being converted by a microprocessor.

15. The device as recited in claim 14, wherein the portions of selected digital media files are communicated in response to a request comprising a mark-up language formatted message.

16. The device as recited in claim 15, wherein the request comprises an HTTP request message.

17. The device as recited in claim 15, wherein the portions of the selected digital media files communicated to the client converter device are converted to a usable format at the client converter device.

18. A non-transitory computer-readable medium having instructions stored thereon that, upon execution by a computing device, cause the computing device to perform operations comprising:

creating a play list for accessing one or more of a plurality of digital media files;

communicating a representation of the play list;

receiving commands for initiating playback of one or more digital media files represented on a display of the representation of the play list, wherein the commands comprise a mark-up language formatted message; and communicating portions of a digital media file requested to be played, wherein the portions of the digital media file are converted upon receipt into a usable format at a client converter device and flow of the portions of the digital media file requested to be played are controlled to permit filling of a store receiving the portions of the digital media file, wherein the computing device is connected to the client converter device only via a local area network, wherein the client converter device includes a non-volatile memory partitioned into at least two sectors, and wherein the client converter device includes a control bit that indicates which sector of the at least two sectors from which an operating system and control firmware is loaded.

19. The non-transitory computer-readable medium as recited in claim 18, wherein commands for initiating playback come from a remote control device, and wherein the remote control device transmits commands to the client converter device to cause the client converter device to transmit via a network a request to initiate playback via the client converter device of one or more digital media files represented on the display of the representation of the play list.

20. The non-transitory computer-readable medium as recited in claim 18, wherein the play list comprises digital media files stored on a server accessible via the local area network.

* * * * *